(12) United States Patent
Hoshi et al.

(10) Patent No.: US 12,280,766 B1
(45) Date of Patent: Apr. 22, 2025

(54) CONTROL METHOD FOR VEHICLE AND VEHICLE

(71) Applicant: Nissan Motor Co., Ltd., Yokohama (JP)

(72) Inventors: Kiyoshi Hoshi, Kanagawa (JP); Yoshihiko Misao, Kanagawa (JP); Hokuto Miyakawa, Kanagawa (JP); Ryota Hagiwara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/857,090

(22) PCT Filed: Apr. 18, 2022

(86) PCT No.: PCT/JP2022/018082
§ 371 (c)(1),
(2) Date: Oct. 15, 2024

(87) PCT Pub. No.: WO2023/203619
PCT Pub. Date: Oct. 26, 2023

(51) Int. Cl.
*B60W 20/17* (2016.01)
*B60W 10/08* (2006.01)
*B60W 10/18* (2012.01)
*B60W 10/26* (2006.01)

(52) U.S. Cl.
CPC .......... *B60W 20/17* (2016.01); *B60W 10/08* (2013.01); *B60W 10/18* (2013.01); *B60W 10/26* (2013.01); *B60W 2510/244* (2013.01); *B60W 2540/10* (2013.01); *B60W 2710/18* (2013.01)

(58) Field of Classification Search
CPC ...... B60W 20/17; B60W 10/08; B60W 10/18; B60W 10/26; B60W 2510/244; B60W 2540/10; B60W 2710/18
See application file for complete search history.

(56) References Cited

U.S. PATENT DOCUMENTS 9,037,333 B2   5/2015  Endo
2022/0363239 A1  11/2022  Hoshi et al.

FOREIGN PATENT DOCUMENTS

JP    2011-240904 A   12/2011
JP       5712999 B2    5/2015
WO    2022024273 A1    2/2022

*Primary Examiner* — Michael V Kerrigan
(74) *Attorney, Agent, or Firm* — Young Basile Hanlon & MacFarlane, P.C.

(57) ABSTRACT

A vehicle has an engine, an electric generator, a drive motor, and a battery, the electric generator driven by the engine to generate electric power, the drive motor driven by the electric power, and regenerative electric power of the drive motor supplied to the battery. The vehicle has a first mode in which braking force compensation by a friction brake is executed during accelerator OFF regeneration which is regeneration by the drive motor where no accelerator operation is executed, and a second mode in which the braking force compensation by the friction brake is not executed during the accelerator OFF regeneration. The method includes executing limitation of input to the battery and allowing a voltage of the battery to be zero due to the limitation of input or a physical property value of the battery affecting the voltage to be different between the first mode and the second mode.

10 Claims, 15 Drawing Sheets

CONTROL METHOD FOR VEHICLE AND VEHICLE

TECHNICAL FIELD

The present invention relates to a control method for a vehicle and a vehicle.

BACKGROUND ART

JP5712999B discloses the following technique in relation to suppressing overcharge by consuming electric power of a battery by executing forced rotation of an engine by a motor together with regenerative braking. That is, JP5712999B discloses a technique in which when generated electric power is exceeded, which is when regenerative electric power of the motor exceeds maximum charging electric power during motor travel priority, the motor is driven in a regenerative manner within a range of the maximum charging electric power while rotation of the engine in an operation stopped state is being limited more than when the generated electric power is exceeded.

SUMMARY OF INVENTION

When the engine is motorized by an electric generator, noise is generated, and the motoring is executed unintentionally for an occupant, for example, to suppress overcharge of the battery. As a result, there is a concern that the occupant has a feeling of discomfort due to motoring noise, that is, the noise generated resulting from the motoring.

The present invention has been made in view of such a problem, and an object of the present invention is to avoid a feeling of discomfort that motoring noise may give to an occupant.

In a control method for a vehicle according to an aspect of the present invention, the vehicle includes a first mode in which braking force compensation by a friction brake is executed during accelerator OFF regeneration which is regeneration by the drive motor in a state where no accelerator operation is executed, and a second mode in which the braking force compensation by the friction brake is not executed during the accelerator OFF regeneration. The control method for a vehicle includes executing limitation of input to the battery, and allowing a voltage of the battery in which electric power input to the battery is zero due to the limitation of input or a physical property value of the battery affecting the voltage to be different between the first mode and the second mode.

According to another aspect of the present invention, there is provided a control device for a vehicle corresponding to the control method for a vehicle.

DESCRIPTION OF EMBODIMENTS

Hereinafter, embodiments of the present invention will be described with reference to the accompanying drawings.

Figure 1:
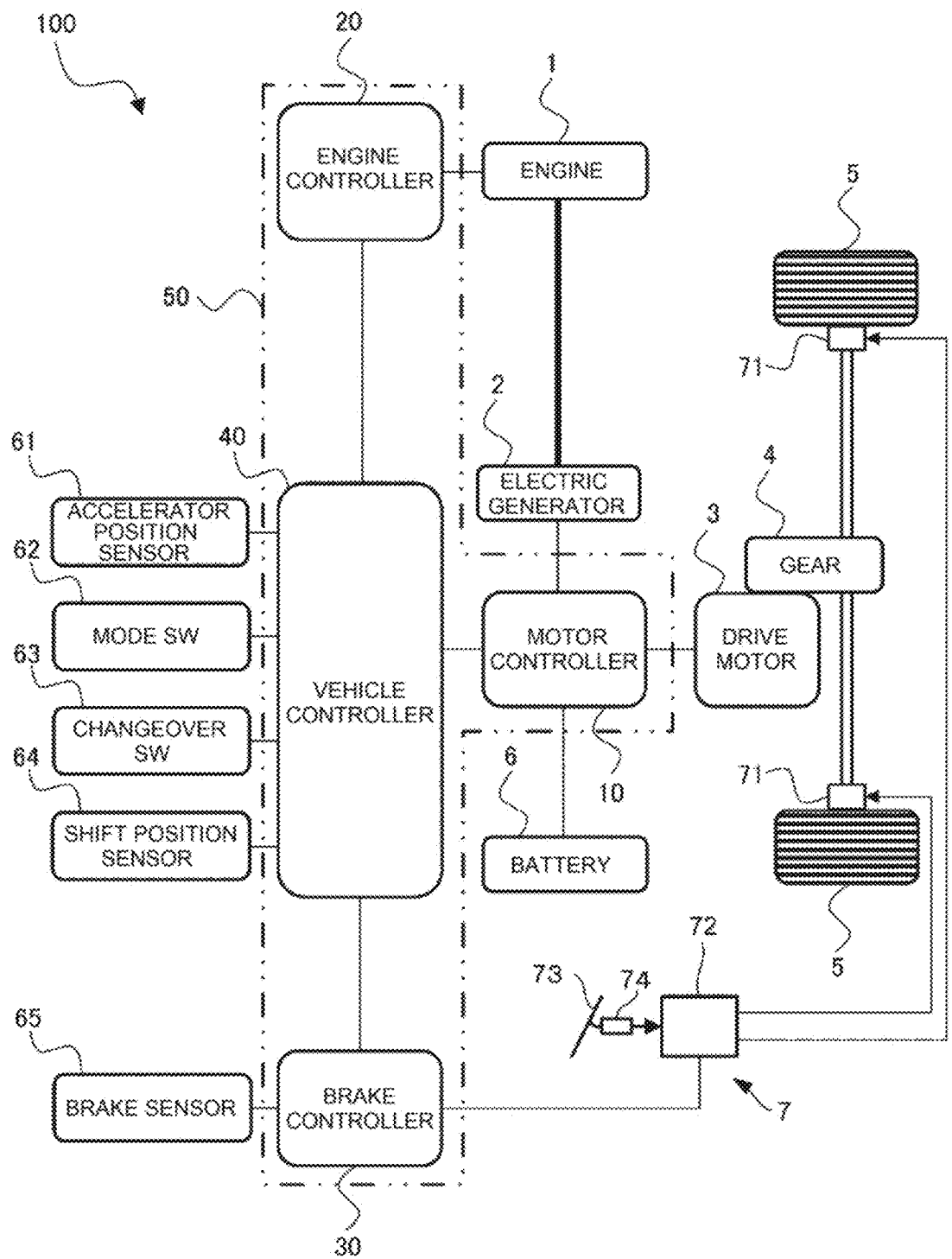
FIG. 1 is a schematic configuration diagram of a vehicle.

FIG. 1 is a schematic configuration diagram of a vehicle 100. The vehicle 100 includes an engine 1, an electric generator 2, a drive motor 3, a gear 4, drive wheels 5, a battery 6, and a brake system 7. The vehicle 100 is a series hybrid vehicle and has a series hybrid mode as a travelling mode. In a case where the travelling mode is the series hybrid mode, the vehicle 100 drives the electric generator 2 with the engine 1 to generate electric power, and drives the drive motor 3 with the electric power generated by the electric generator 2.

The engine 1 is an internal combustion engine and is a gasoline engine. The engine 1 is connected to the electric generator 2 in a power transmittable manner. The electric generator 2 is a motor generator for electric power generation, and also executes motoring of the engine 1 in addition to the electric power generation. The motoring is executed by driving the engine 1 in an operation stopped state by the electric generator 2. The drive motor 3 is a motor generator for driving and generates a driving force for the vehicle 100. The driving force generated by the drive motor 3 is transmitted to the drive wheels 5 via the gear 4 which is a reduction gear. The drive motor 3 is driven by power from the drive wheels 5 to execute energy regeneration. Energy regenerated by the drive motor 3 as electric power can be charged into the battery 6.

The battery 6 stores the electric power generated by the electric generator 2 and the electric power regenerated by the drive motor 3. An electric power discharge start state of charge (SOC) is set in the battery 6. The SOC is an example of a physical property value of the battery 6 that affects a voltage of the battery 6, and indicates a state of charge of the battery 6. The electric power discharge start SOC is set in advance as a value for defining a full charge of the battery 6. In other words, the full charge of the battery 6 is defined by the electric power discharge start SOC, and for example, a case where the SOC as a charging rate is 90% is considered to be the full charge.

The brake system 7 includes friction brakes 71, a brake actuator 72, a brake pedal 73, and a master cylinder 74. The friction brake 71 is provided on the drive wheel 5. A braking force of the friction brake 71 is controlled by the brake actuator 72. The brake actuator 72 controls the braking force based on a brake fluid pressure generated by the master cylinder 74 converting a pedal force of the brake pedal 73.

The vehicle 100 further includes a motor controller 10, an engine controller 20, a brake controller 30, and a vehicle controller 40. The controllers 10 to 40 are communicably connected to each other. The motor controller 10 is implemented by one or a plurality of microcomputers including a central processing unit (CPU), a read-only memory (ROM), a random access memory (RAM), and an input/output interface (I/O interface). In the motor controller 10, various kinds of control are executed by the CPU executing programs stored in the ROM or the RAM. The same applies to the engine controller 20, the brake controller 30, and the vehicle controller 40.

The motor controller 10 controls the electric generator 2 and the drive motor 3. The motor controller 10 further includes a first inverter that is an inverter for the electric generator 2 and a second inverter that is an inverter for the drive motor 3. The inverters may be understood as configurations separate from the motor controller 10. The motor controller 10 controls the electric generator 2 and the drive motor 3 by controlling the first inverter and the second inverter.

The first inverter is connected to the electric generator 2 and the battery 6. The first inverter converts an alternating current supplied from the electric generator 2 into a direct current and supplies the direct current to the battery 6. Accordingly, the battery 6 is charged with the electric power generated by the electric generator 2. The first inverter further converts a direct current supplied from the battery 6 into an alternating current and supplies the alternating current to the electric generator 2. Accordingly, the electric generator 2 is driven by electric power of the battery 6. The same applies to the second inverter, the drive motor 3, and the battery 6. Signals of a current, a voltage, an SOC, and the like are also input to the motor controller 10 from the electric generator 2, the drive motor 3, and the battery 6.

The engine controller 20 controls the engine 1, and the brake controller 30 controls the brake system 7. The vehicle controller 40 integrally controls the engine 1, the electric generator 2, the drive motor 3, the brake system 7, and the like. The vehicle controller 40 receives signals from an accelerator position (accelerator opening degree) sensor 61 for detecting an accelerator position APO, a mode SW 62 for selecting a drive mode by an operation of a driver, a changeover SW 63 for switching between execution and non-execution of friction brake compensation to be described later, and a shift position sensor 64 for detecting a shift position (range) selected by the operation of a driver. The vehicle controller 40 also receives a signal and the like from a brake sensor 65 for detecting a brake fluid pressure via the brake controller 30. The vehicle controller 40 constitutes a controller 50 together with the motor controller 10, the engine controller 20, and the brake controller 30.

Figure 2:
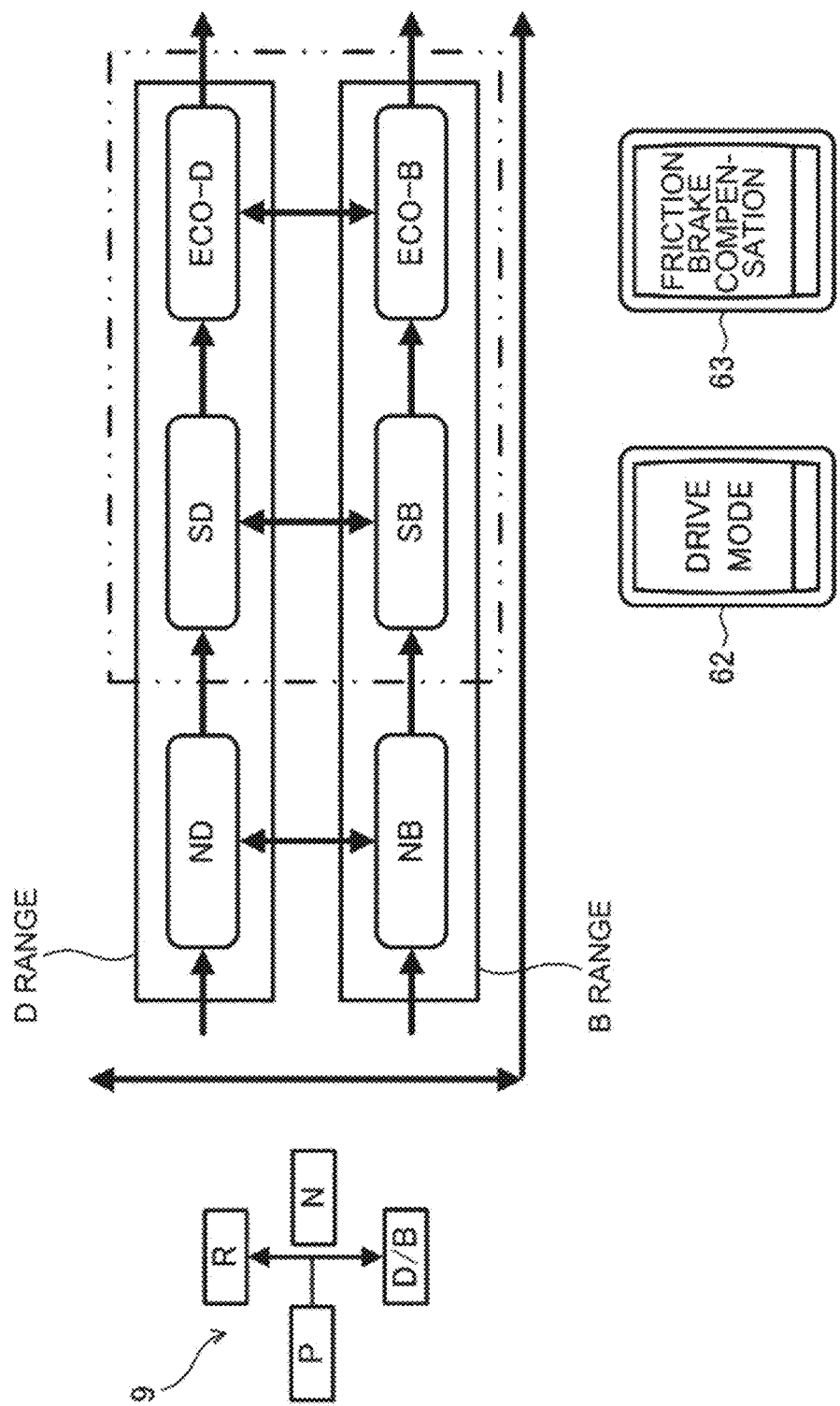
FIG. 2 is an explanatory diagram of a shift position and a drive mode.

FIG. 2 is an explanatory diagram of the shift position and the drive mode. The vehicle 100 further includes a shifter 9. The shifter 9 is a device for selecting the shift position by the operation of a driver, and the operation of a driver is performed by a shift lever operation or a switch operation to a gate corresponding to each shift position. The shifter 9 is a momentary type shifter. In the momentary shifter 9, a shift lever released from the operation of a driver autonomously returns to a home position which is a neutral position.

Shift positions that can be selected by the shifter 9 include a P range (parking range), an R range (reverse range), an N range (neutral range), as well as a D range which is a first forward range and a B range which is a second forward range. The D range and the B range are selected by a shift lever operation to a D/B gate common to the D range and the B range. By the shift lever operation to the D/B gate, the B range is selected in a case where the D range is selected, and the D range is selected in a case where the B range is selected. In a case where a range other than the D range and the B range is selected, the D range is selected by the shift lever operation to the D/B gate.

Drive modes that can be selected by the mode SW 62 include an N mode, an S mode, and an ECO mode. The N mode is a mode (normal mode) in which acceleration is executed by an accelerator pedal operation. Therefore, in the N mode, strong regenerative deceleration is not executed by the accelerator pedal operation. Each of the S mode and the ECO mode is a mode (one-pedal mode) in which the acceleration and the regenerative deceleration are executed by the accelerator pedal operation, and the ECO mode is a mode more suitable for fuel-efficient driving than the S mode. The drive mode is changed to the N mode, the S mode, and the ECO mode in this order every time the mode SW 62 is pressed, and returns to the N mode after the ECO mode.

In the S mode and the ECO mode, a deceleration is generated by executing regeneration by the drive motor 3. In other words, the deceleration is a negative acceleration and is represented by a negative value. In the S mode, a regeneration limit amount (magnitude of a regeneration limit) is set larger than that in the ECO mode. In other words, regeneration is less suppressed in the S mode than in the ECO mode. Accordingly, electric power obtained by the regeneration in the S mode is greater than that in the ECO mode, and a magnitude of the generated deceleration is also larger.

The changeover SW 63 is used to select a first mode in which the friction brake compensation is executed and a second mode in which the friction brake compensation is not executed, and constitutes a selector for allowing a driver to select an operation mode of the friction brake 71 for the execution or non-execution of the friction brake compensation. The friction brake compensation will be described below.

Figure 3:
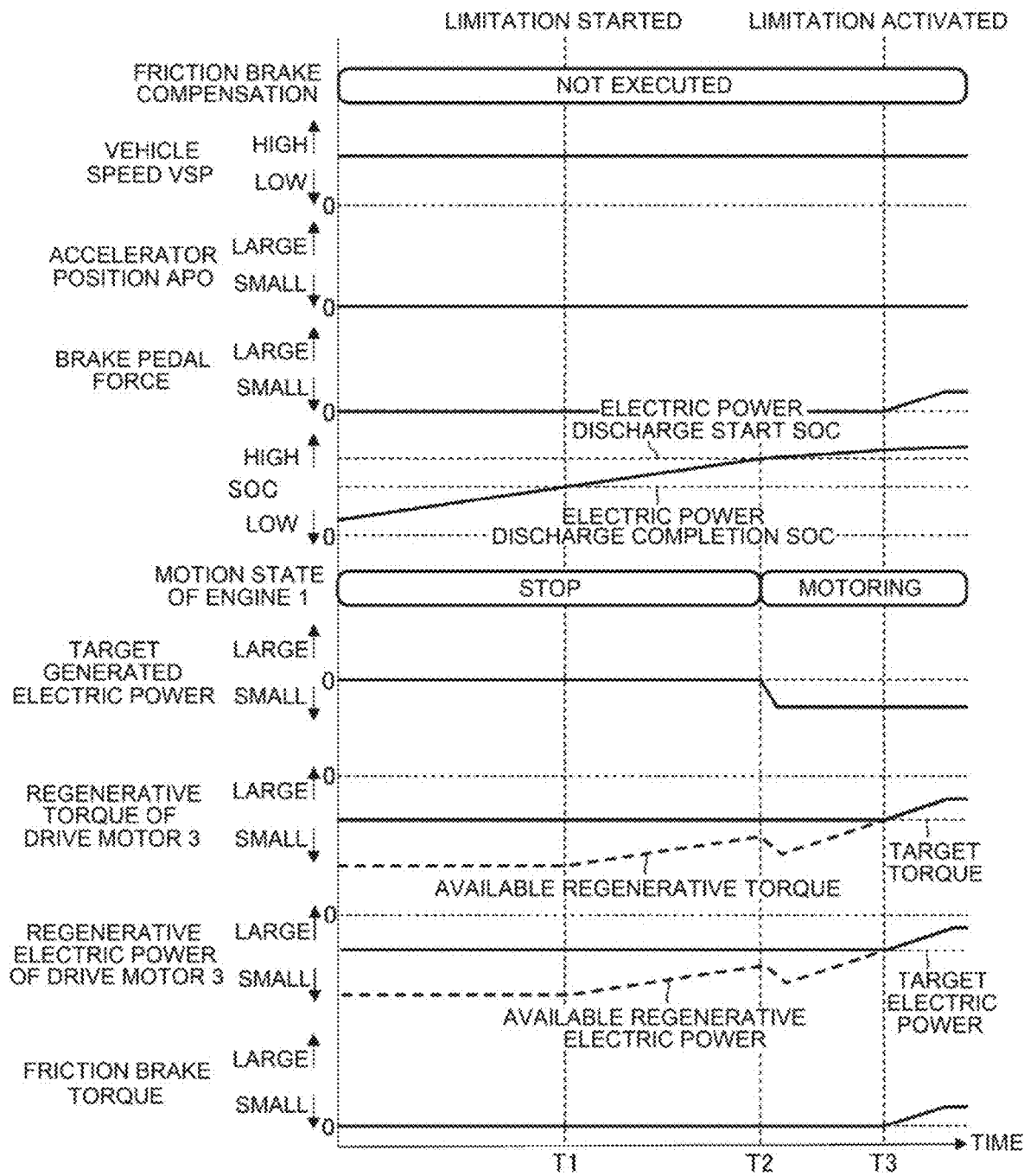
FIG. 3 is a first diagram of diagrams illustrating friction brake compensation.
Figure 4:
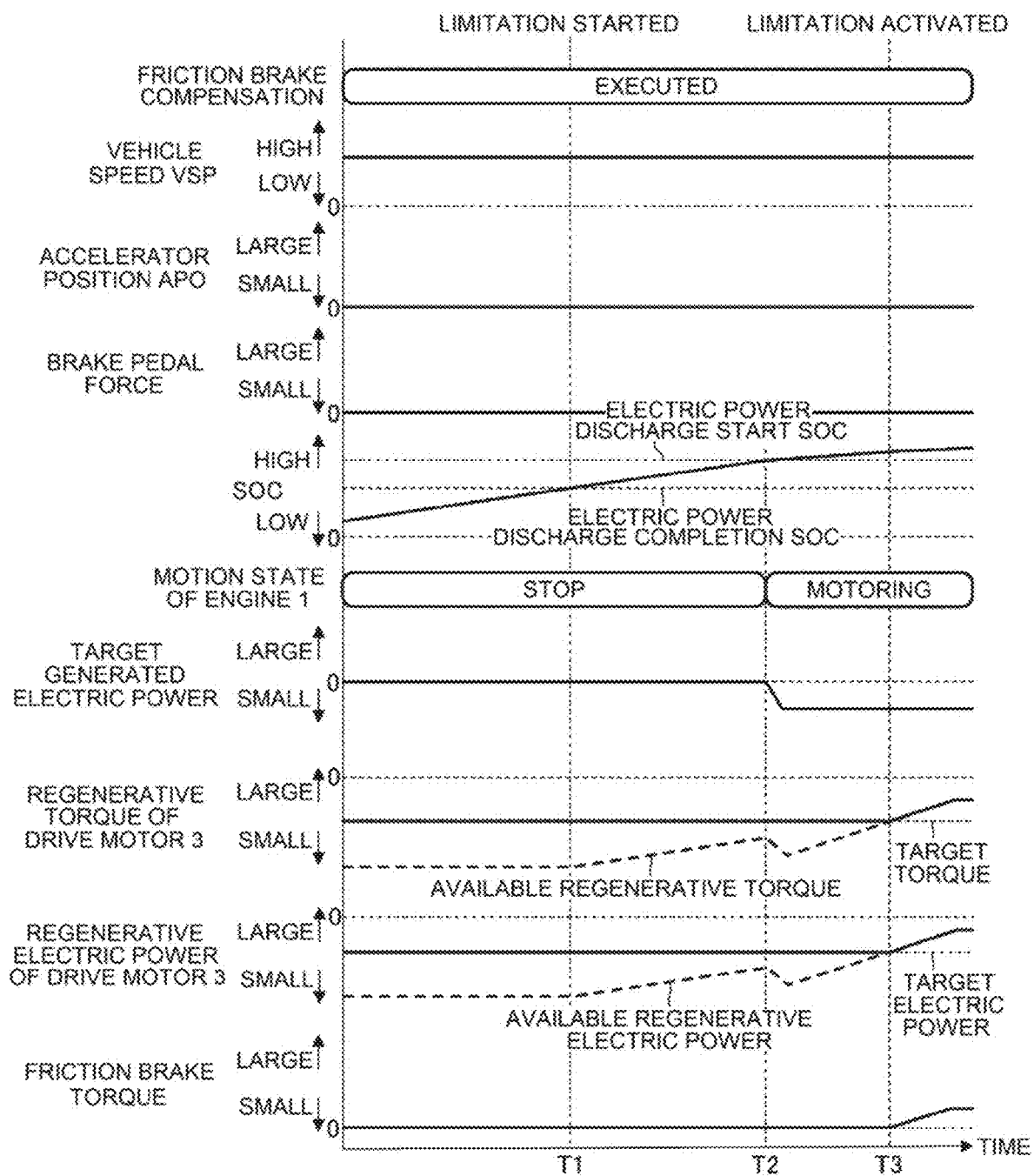
FIG. 4 is a second diagram of the diagrams illustrating the friction brake compensation.

FIGS. 3 and 4 are diagrams illustrating the friction brake compensation with timing charts. FIG. 3 illustrates a case where the friction brake compensation is not executed, and FIG. 4 illustrates a case where the friction brake compensation is executed. FIGS. 3 and 4 both illustrate changes in various parameters during accelerator OFF regeneration, that is, during regeneration by the drive motor 3 in a state where no accelerator operation is executed.

In the examples, by the accelerator OFF regeneration, a vehicle speed VSP is constant, and the accelerator position APO and a brake pedal force are zero. Since the brake pedal force is zero, a friction brake torque is zero. The vehicle speed VSP is constant because acceleration and deceleration are balanced on a downhill. In the examples, in an initial stage of the timing chart, target generated electric power is zero, and the engine 1 is in an operation stopped state.

In order to compare and describe a difference between the execution and non-execution of the friction brake compensation, electric power discharge start SOCs and electric power discharge completion SOCs are the same in FIGS. 3 and 4, and a change of the SOC up to a timing T3 is the same in FIGS. 3 and 4. Therefore, the following description will be made with reference to the timing chart illustrated in FIG. 3, including the change up to the timing T3.

At a timing T1, the SOC is the electric power discharge completion SOC. In the example, a start SOC of limitation of input to the battery 6 is set to the same value as the electric power discharge completion SOC. The limitation of input to the battery 6, that is, limitation of the electric power input to the battery 6 is executed by gradually reducing available regenerative electric power of the drive motor 3 in absolute value as the SOC increases. The available regenerative electric power is a value for limiting regenerative electric power to be equal to or smaller than the available regenerative electric power in absolute value. The limitation of input is activated when the regenerative electric power and the available regenerative electric power become equal, and is not activated in a case where the regenerative electric power is smaller than the available regenerative electric power in absolute value. When such limitation of input is started from the timing T1, the available regenerative electric power is gradually reduced in absolute value.

At the timing T1, limitation of regeneration of the drive motor 3 is also started. The limitation of regeneration is executed by gradually reducing an available regenerative torque of the drive motor 3 in absolute value as the SOC increases. The limitation of regeneration is activated when a regenerative torque and the available regenerative torque become equal, and is not activated in a case where the regenerative torque is smaller than the available regenerative torque in absolute value. The available regenerative torque is a value for limiting the regenerative torque to be equal to or smaller than the available regenerative torque in absolute value. When such limitation of regeneration is started from the timing T1, the available regenerative torque is gradually reduced in absolute value.

At the timing T1, the regenerative torque is smaller than the available regenerative torque in absolute value. Therefore, the limitation of regeneration is not activated, and the regenerative torque is controlled to a target torque. The target torque is calculated based on the vehicle speed VSP and the accelerator position APO. Regenerative electric power obtained according to the regenerative torque is also controlled to target electric power similarly to the regenerative torque.

At a timing T2, the SOC reaches the electric power discharge start SOC, and the target generated electric power changes from zero to a negative value. Therefore, the motoring of the engine 1 is started, and electric power discharge of the battery 6 is executed by power consumption of the electric generator 2. As a result, the available regenerative electric power and the available regenerative torque increase in absolute values. The SOC gradually increases by an amount of electric power discharge compared to before the timing T2. The available regenerative electric power and the available regenerative torque increase in absolute values to magnitudes corresponding to the target generated electric power, and then start to be reduced in absolute values again.

At the timing T3, the limitation of input is activated as a result of the available regenerative electric power reaching the regenerative electric power. When the limitation of input is activated, the regenerative electric power is limited to the available regenerative electric power. Similarly, at the timing T3, the limitation of regeneration of the drive motor 3 is activated as a result of the available regenerative torque reaching the regenerative torque, and the regenerative torque is limited to the available regenerative torque. When the regenerative torque is limited to the available regenerative torque, a regenerative braking force is reduced by an amount corresponding to a magnitude of a difference between the available regenerative torque and the target torque.

In a case where the friction brake compensation is not executed, it is necessary to execute a brake operation in order to ensure a braking force of an amount corresponding to the reduction due to the limitation of regeneration. Therefore, in the example, when the brake operation is started from the timing T3, the brake pedal force increases, and the friction brake torque increases accordingly. That is, in the case where the friction brake compensation is not executed, when the limitation of regeneration is executed, the driver performs the brake operation as necessary, and the brake operation needs to correspond to a change in deceleration due to the limitation of regeneration.

In a case where the friction brake compensation is executed as illustrated in FIG. 4, the friction brake compensation is executed from the timing T3. The friction brake compensation is braking force compensation by the friction brake 71, and is a control in which the braking force of the friction brake 71 compensates for the braking force of the amount corresponding to the reduction due to the limitation of regeneration. Therefore, in this case, the friction brake torque is increased by the friction brake compensation, and the braking force of the amount corresponding to the reduction due to the limitation of regeneration is compensated. As a result, in this case, the deceleration is maintained even when the limitation of regeneration is executed, and the driver is released from a trouble of performing the brake operation.

When the engine 1 is motorized by the electric generator 2, noise is generated, and the motoring is executed unintentionally for an occupant, for example, to suppress overcharge of the battery 6. As a result, there is a concern that the occupant may have a feeling of discomfort due to the motoring noise.

In view of such circumstances, in the present embodiment, the vehicle controller 40 is implemented as described below.

Figure 5:
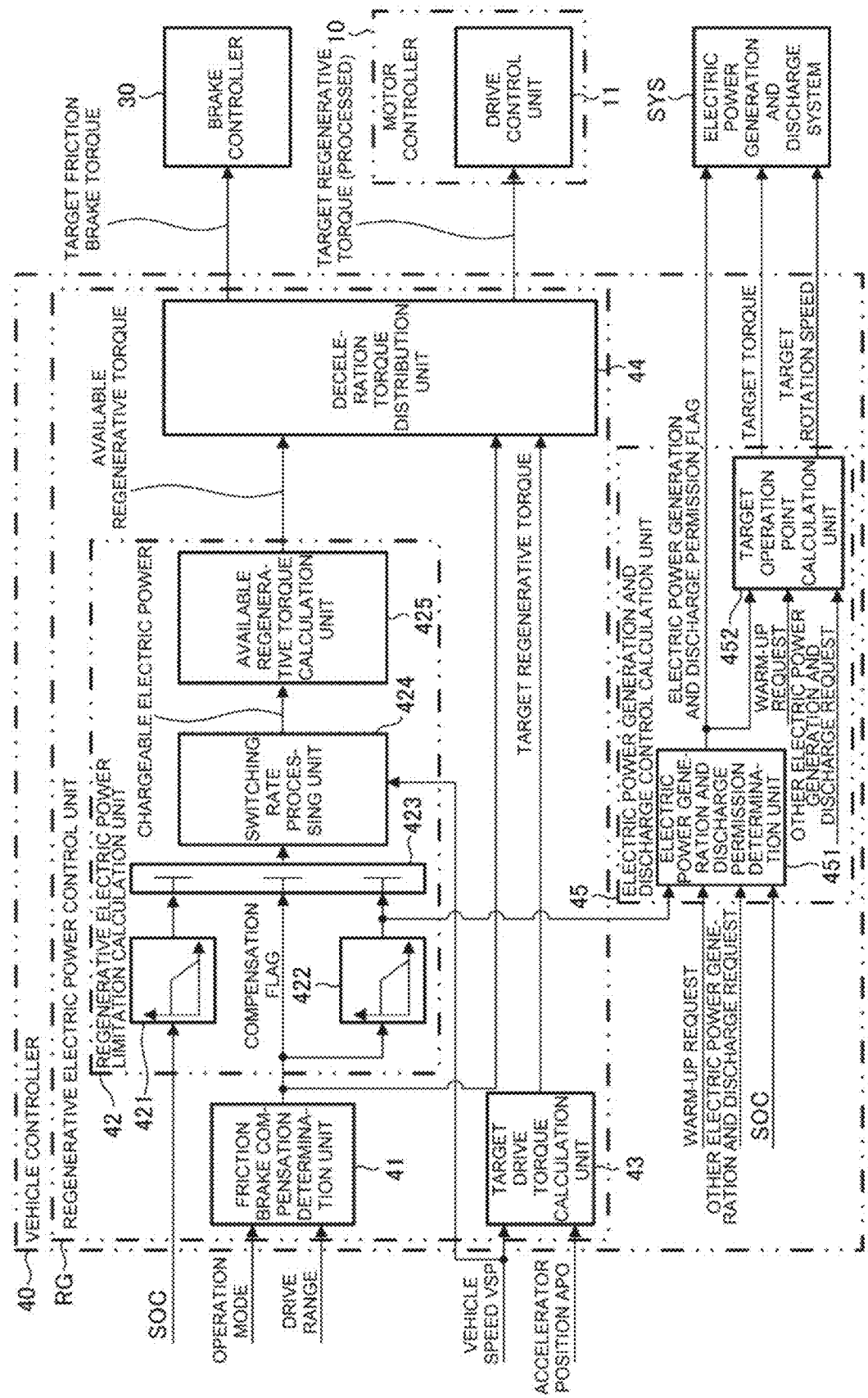
FIG. 5 is a block diagram illustrating processes of a vehicle controller.

FIG. 5 is a block diagram illustrating processes of the vehicle controller 40. The vehicle controller 40 includes a friction brake compensation determination unit 41, a regenerative electric power limitation calculation unit 42, a target drive regenerative torque calculation unit 43, a deceleration torque distribution unit 44, and an electric power generation and discharge control calculation unit 45.

The friction brake compensation determination unit 41 determines whether the friction brake compensation is set based on an input signal. A signal of the operation mode of the friction brake 71 and a signal of a drive range are input to the friction brake compensation determination unit 41. The signal of the operation mode is used to determine which of the first mode and the second mode is selected. The signal of the drive range is used to determine whether the selected range is a non-travel range (P range or N range), and since the friction brake compensation is not required in a case of the non-travel range, it can be considered that no setting is made.

Therefore, in a case where the second mode is selected or the non-travel range is selected, it is determined that the friction brake compensation is not executed (the friction brake compensation is not set). On the other hand, in a case where the first mode is selected and a range other than the non-travel range is selected, it is determined that the friction brake compensation is executed (the friction brake compensation is set). In a case where it is determined that the friction brake compensation is executed, a compensation flag is turned ON, and in a case where it is determined that the friction brake compensation is not executed, the compensation flag is turned OFF. The compensation flag is input from the friction brake compensation determination unit 41 to the regenerative electric power limitation calculation unit 42 and the deceleration torque distribution unit 44.

The regenerative electric power limitation calculation unit 42 includes a first chargeable electric power calculation unit 421, a second chargeable electric power calculation unit 422, a chargeable electric power selection unit 423, a switching rate processing unit 424, and an available regenerative torque calculation unit 425, and calculates the available regenerative torque. In other words, the available regenerative torque is an upper limit regenerative torque in absolute value that can be maximally regenerated by the drive motor 3.

The first chargeable electric power calculation unit 421 calculates regenerative electric power in a case of the first mode, and the second chargeable electric power calculation unit 422 calculates regenerative electric power in a case of the second mode. The SOC of the battery 6 is input to the first chargeable electric power calculation unit 421 and the second chargeable electric power calculation unit 422, and each of these calculation units 421 and 422 calculates the regenerative electric power based on the input SOC. A signal of the compensation flag is also input to the second chargeable electric power calculation unit 422. In each of the calculation units 421 and 422, chargeable electric power is calculated based on battery charging characteristics to be described below.

Figure 6:
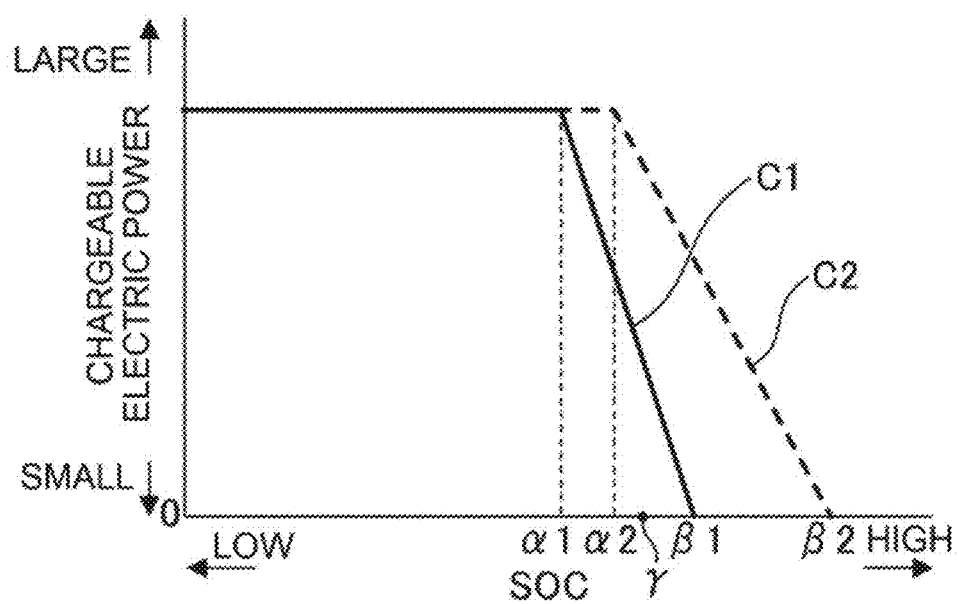
FIG. 6 is a diagram illustrating an example of battery charging characteristics.

FIG. 6 is a diagram illustrating an example of the battery charging characteristics. A solid line indicates a first charging characteristic C1, and a broken line indicates a second charging characteristic C2. In FIG. 6, for convenience of description, the first charging characteristic C1 and the second charging characteristic C2 are illustrated in the same graph, but these characteristics C1 and C2 can be defined by separate map data. The first charging characteristic C1 is applied to the first mode, and the second charging characteristic C2 is applied to the second mode. In each of the first charging characteristic C1 and the second charging characteristic C2, the chargeable electric power of the battery 6 is set in advance according to the SOC, and the battery 6 cannot be charged when charging electric power exceeds the chargeable electric power. Accordingly, the chargeable electric power is, in other words, available input electric power, and the limitation of input to the battery 6 can be represented by the chargeable electric power. The chargeable electric power is set with respect to the regenerative electric power of the drive motor 3, and corresponds to a magnitude of the available regenerative electric power.

In the first charging characteristic C1, in a case where the SOC is less than a first input limitation start value $\alpha 1$, the limitation of input is not executed, and the chargeable electric power is constant. On the other hand, in a case where the SOC is equal to or greater than the first input limitation start value $\alpha 1$, the limitation of input is executed, and the chargeable electric power is set to be smaller as the SOC is higher. Further, in a case where the SOC is equal to or greater than a first zero limit value $\beta 1$ that is greater than the first input limitation start value $\alpha 1$, the chargeable electric power is set to zero. The first zero limit value $\beta 1$ indicates a zero limit value R of the electric power input to the battery 6 in the case where the friction brake compensation is executed.

In the second charging characteristic C2, in a case where the SOC is less than a second input limitation start value $\alpha 2$, the limitation of input is not executed, and the chargeable electric power is constant. On the other hand, in a case where the SOC is equal to or greater than the second input limitation start value $\alpha 2$, the limitation of input is executed, and the chargeable electric power is set to be smaller as the SOC is higher. Further, in a case where the SOC is equal to or greater than a second zero limit value $\beta 2$ that is greater than the second input limitation start value $\alpha 2$, the chargeable electric power is set to zero. The second zero limit value $\beta 2$ is the zero limit value R in the case where the friction brake compensation is not executed, and is set to the electric power discharge start SOC. Therefore, when the SOC is equal to or greater than the second zero limit value $\beta 2$, reduction of the SOC is achieved by the motoring.

The first input limitation start value $\alpha 1$ and the second input limitation start value $\alpha 2$ are set to values different from each other. In other words, in the first charging characteristic C1 and the second charging characteristic C2, SOCs at which the limitation of input is started are set to values different from each other. Accordingly, the first charging characteristic C1 and the second charging characteristic C2 allow the SOCs at which the limitation of input to the battery 6 is started to be different between the first mode in which the first charging characteristic C1 is applied and the second mode in which the second charging characteristic C2 is applied.

Similarly, the first zero limit value $\beta 1$ and the second zero limit value $\beta 2$ are set to values different from each other. In other words, in the first charging characteristic C1 and the second charging characteristic C2, the SOCs at which the chargeable electric power is zero are set to values different from each other. Accordingly, the first charging characteristic C1 and the second charging characteristic C2 allow the SOCs at which the electric power input to the battery 6 is zero due to the limitation of input to be different between the first mode and the second mode.

The first input limitation start value $\alpha 1$ is set to be smaller than the second input limitation start value $\alpha 2$. Accordingly, in the case where the first mode is selected, the limitation of input is started at an SOC lower than that in the case where the second mode is selected. In addition, the first zero limit value $\beta 1$ is set to be smaller than the second zero limit value $\beta 2$. Accordingly, in the case where the first mode is selected, the electric power input to the battery 6 is limited to zero at an SOC lower than that in the case where the second mode is selected, and the regeneration is stopped accordingly. The first zero limit value $\beta 1$ may be set smaller than the second input limitation start value $\alpha 2$. A pre-discharge start value $\gamma$ will be described later.

In the present embodiment, as a simple method for managing an amount of charge of the battery 6, only the SOC is used as a parameter for setting the charging characteristic. Control of input and output electric power of the battery 6 is set for the purpose of preventing the overcharge of the battery 6, and a battery voltage (voltage of battery 6) is controlled within a normal use range by electric power charge limitation and electric power discharge control. The SOC is an index indicating the amount of charge of the battery 6, and the battery voltage tends to increase as the SOC increases. Therefore, the battery voltage can be controlled to an appropriate voltage by limiting charging electric power of the battery 6 and facilitating electric power discharge as the SOC increases. Parameters used to prevent the overcharge of the battery 6 include the battery voltage and a battery temperature (temperature of battery 6) in addition to the SOC, and by using at least one parameter including the SOC, the battery voltage can be controlled to prevent the overcharge. Regarding the battery voltage, in order to avoid overvoltage due to a voltage rise caused by a resistance during charging, the charging electric power is set to be lower as a base voltage (for example, voltage at the time of no load) is higher, thereby preventing overvoltage of the battery 6. Regarding the battery temperature, the lower the battery temperature, the higher an internal resistance value, and the larger an amount of voltage rise during charging. Accordingly, the lower the battery temperature, the more the charging electric power of the battery 6 is limited, thereby preventing the overvoltage.

Returning to FIG. 5, the first chargeable electric power calculation unit 421 calculates the chargeable electric power in the first mode by calculating the chargeable electric power with reference to the first charging characteristic C1. The second chargeable electric power calculation unit 422 calculates the chargeable electric power in the second mode by calculating the chargeable electric power with reference to the second charging characteristic C2. The chargeable electric power calculated by the first chargeable electric power calculation unit 421 is input to the chargeable electric power selection unit 423. The chargeable electric power calculated by the second chargeable electric power calculation unit 422 is input to the chargeable electric power selection unit 423 and the electric power generation and discharge control calculation unit 45.

The chargeable electric power selection unit 423 selects the chargeable electric power based on the input compensation flag. In a case where the compensation flag is ON, the chargeable electric power in the first mode is selected, and in a case where the compensation flag is OFF, the chargeable electric power in the second mode is selected. The chargeable electric power selection unit 423 selects a battery charging characteristic corresponding to whether the friction brake compensation is set as described below through the selection of the chargeable electric power.

Figure 7:
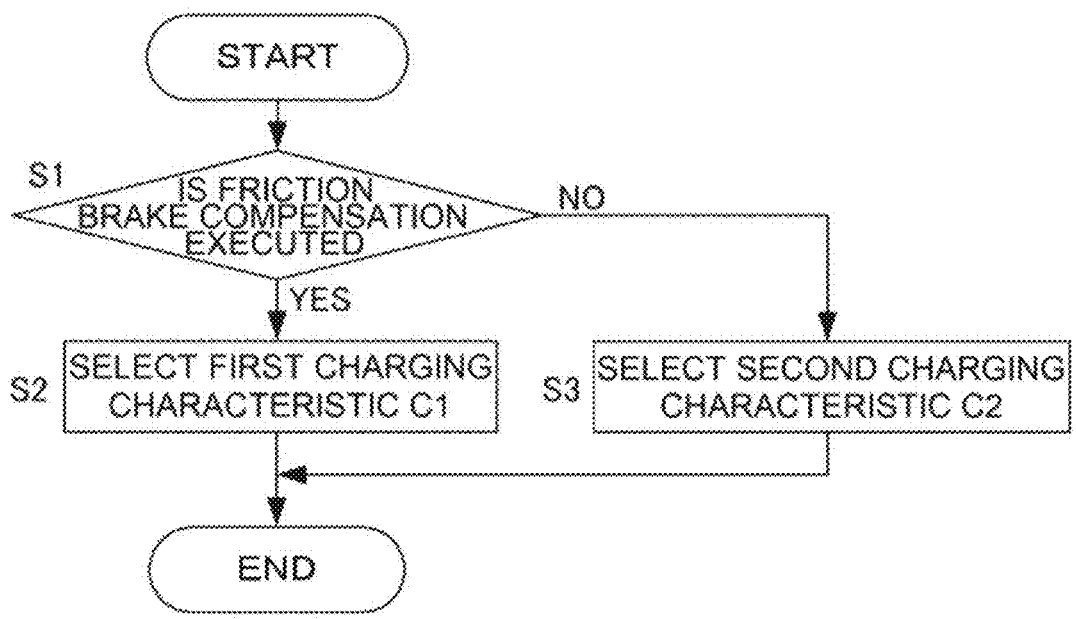
FIG. 7 is a diagram illustrating a flowchart of an example of a selection process of the battery charging characteristics.

FIG. 7 is a diagram illustrating a flowchart of an example of a selection process of the battery charging characteristics executed by the vehicle controller 40. The process of step S1 corresponds to the friction brake compensation determination unit 41, and the processes of step S2 and step S3 correspond to the chargeable electric power selection unit 423. In step S1, it is determined whether the friction brake compensation is executed. When determination in step S1 is positive, the process proceeds to step S2, and the first charging characteristic C1 is selected. That is, in the case where the friction brake compensation is executed, the first charging characteristic C1 is set as a reference target to calculate regenerative electric power limitation. When the determination in step S1 is negative, the process proceeds to step S3, and the second charging characteristic C2 is selected. That is, in the case where the friction brake compensation is not executed, the second charging characteristic C2 is set as the reference target to calculate the regenerative electric power limitation. After step S2 and step S3, the process ends.

Returning to FIG. 5, the chargeable electric power selected by the chargeable electric power selection unit 423 is input to the switching rate processing unit 424. The switching rate processing unit 424 executes switching rate processing of the limitation of input. The switching rate is a change rate of the limitation of input as a function of time, and is defined for the chargeable electric power as a reduction rate as a function of time.

In the switching rate processing, in a case of transition from the second mode to the first mode, the switching rate is applied to the chargeable electric power in the second mode at the time when the first mode is selected, and the chargeable electric power is changed according to the switching rate, thereby gradually reducing the chargeable electric power. At the time of transition from the second mode to the first mode, limitation of input obtained by changing the chargeable electric power according to the switching rate in this manner is used as the limitation of input to the battery 6. This is for the following reason.

That is, referring to FIG. 6, for example, in a case where the SOC is the second input limitation start value α2, the limitation of input is started in the second mode, while the chargeable electric power is already limited in the first mode. Therefore, when the limitation of input executed in the second mode is immediately switched to the limitation of input executed in the first mode in such a case, the regeneration is limited due to a rapid reduction in the chargeable electric power, and as a result, the deceleration is rapidly reduced in absolute value, which may give the occupant a feeling of discomfort. Therefore, at the time of the transition from the second mode to the first mode, the limitation of input obtained as described above is used as the limitation of input to the battery 6. The switching rate is further set as follows.

Figure 8:
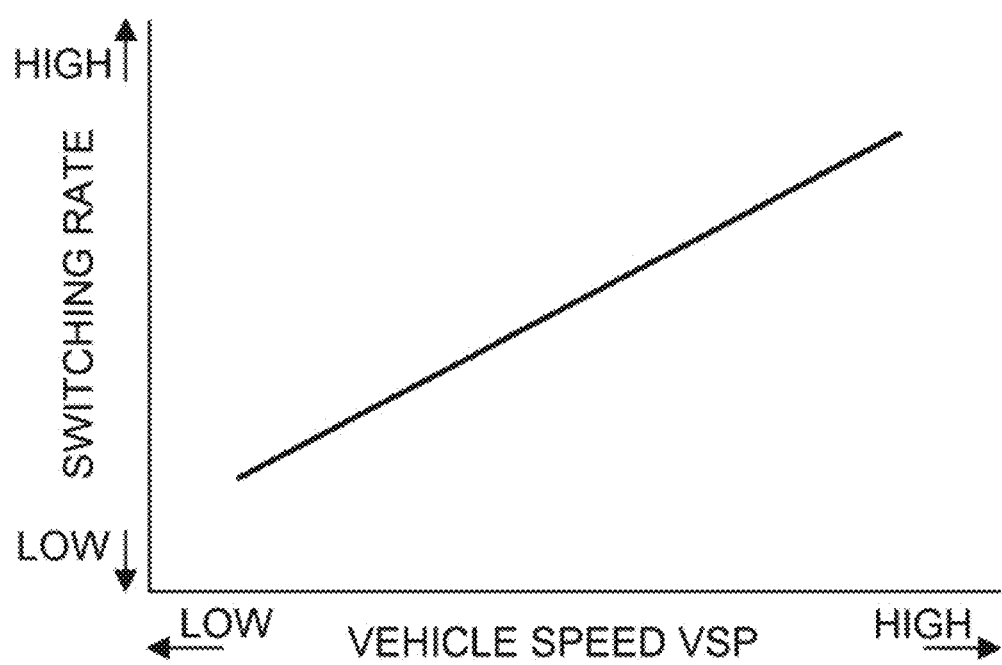
FIG. 8 is a diagram illustrating an example of setting a switching rate corresponding to a vehicle speed.

FIG. 8 is a diagram illustrating an example of setting a switching rate corresponding to the vehicle speed VSP. The switching rate is set to be higher as the vehicle speed VSP is higher. This reason is that, in order to limit the change in deceleration within a predetermined range, it is necessary to set a change in regenerative electric power to be slower as motor torque sensitivity to a change in regenerative input electric power is higher and the vehicle speed is lower. From such a viewpoint, the switching rate can be set in advance according to the vehicle speed VSP.

Returning to FIG. 5, the chargeable electric power adopted by the switching rate processing unit 424 is input to the available regenerative torque calculation unit 425. The available regenerative torque calculation unit 425 calculates the available regenerative torque based on the input chargeable electric power. The available regenerative torque is obtained by making the chargeable electric power negative, that is, by converting the available regenerative electric power into a regenerative torque. The calculated available regenerative torque is input to the deceleration torque distribution unit 44.

The target drive regenerative torque calculation unit 43 calculates a target drive torque based on the vehicle speed VSP and the accelerator position APO. The target drive torque is set in advance according to the vehicle speed VSP and the accelerator position APO, and during the accelerator OFF regeneration, a negative target drive torque is calculated as a target regenerative torque. The calculated target regenerative torque is input to the deceleration torque distribution unit 44.

The deceleration torque distribution unit 44 distributes the input target regenerative torque into a target friction brake torque and a target regenerative torque processed by the deceleration torque distribution unit 44. In a case where the compensation flag is ON and the input target regenerative torque is larger than the available regenerative torque in absolute value, the regeneration cannot be executed with the input target regenerative torque. Therefore, in this case, the available regenerative torque is set to the processed target regenerative torque, and the target friction brake torque is set to a torque of a magnitude of a difference between the input target regenerative torque and the available regenerative torque.

In a case where the compensation flag is ON and the input target regenerative torque is equal to or less than the available regenerative torque in absolute value, the input target regenerative torque is set to the processed target regenerative torque, and the target friction brake torque is set to zero. The same applies to a case where the compensation flag is OFF. The target friction brake torque is input from the deceleration torque distribution unit 44 to the brake controller 30, and the processed target regenerative torque is input to a drive control unit 11 of the motor controller 10. The drive control unit 11 controls the drive motor 3 based on the input target regenerative torque.

The electric power generation and discharge control calculation unit 45 includes an electric power generation and discharge permission determination unit 451 and a target operation point calculation unit 452, and executes calculation for electric power generation control in which the electric generator 2 is driven by the engine 1 to generate electric power and for electric power discharge control executed by motorizing the engine 1 by the electric generator 2.

The electric power generation and discharge permission determination unit 451 sets an electric power generation and discharge permission flag based on an input signal. In addition to the chargeable electric power in the second mode, a warm-up request of the engine 1 and other electric power generation and discharge requests thereof are input to the electric power generation and discharge permission determination unit 451. Warm-up of the engine 1 is executed based on an engine water temperature, for example, for warm-up of an exhaust gas purifying catalyst. Since the warm-up request is accompanied by driving of the electric generator 2, the warm-up request is made as an electric power generation request.

The other electric power generation and discharge requests include, for example, an electric power generation request and an electric power discharge request made according to the SOC for energy management of the battery 6. Such an electric power discharge request includes, for example, an electric power discharge request for executing the motoring to suppress the overcharge of the battery 6. The other electric power generation and discharge requests include an electric power generation and discharge request made regardless of the SOC.

The electric power generation and discharge permission flag includes an electric power generation permission flag and an electric power discharge permission flag. For example, when the warm-up request is made, the warm-up request is prioritized for catalyst early activation, and the electric power generation permission flag is turned ON. In a case where the other electric power generation and discharge requests are electric power generation and discharge requests corresponding to the SOC, the electric power generation permission flag or the electric power discharge permission flag is turned ON. The electric power generation and discharge permission flag is turned OFF in a case where no warm-up request or other electric power generation and discharge request is made. The electric power discharge request corresponding to the SOC is made after setting the electric power discharge start SOC as described below.

Figure 9:
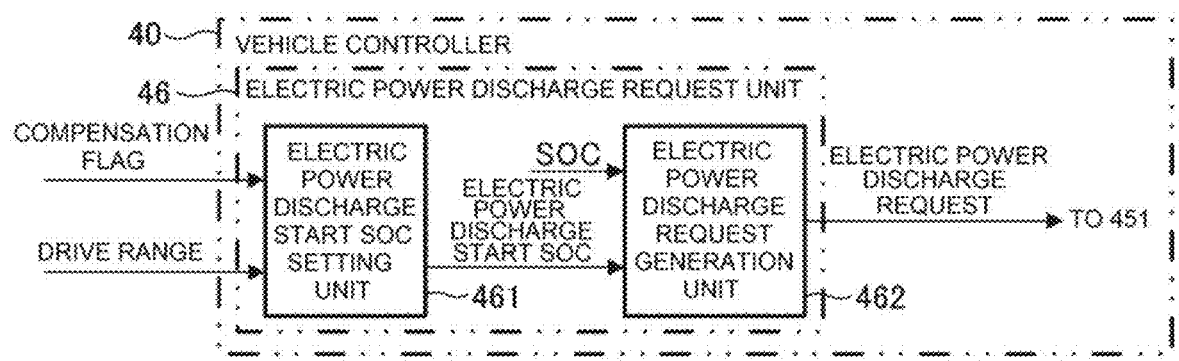
FIG. 9 is a block diagram illustrating an electric power discharge request process.

FIG. 9 is a block diagram illustrating an electric power discharge request process. The vehicle controller 40 further includes an electric power discharge request unit 46. The electric power discharge request unit 46 includes an electric power discharge start SOC setting unit 461 and an electric power discharge request generation unit 462. The signals of the compensation flag and the drive range are input to the electric power discharge start SOC setting unit 461. The electric power discharge start SOC setting unit 461 sets the electric power discharge start SOC as described below.

Figure 10:
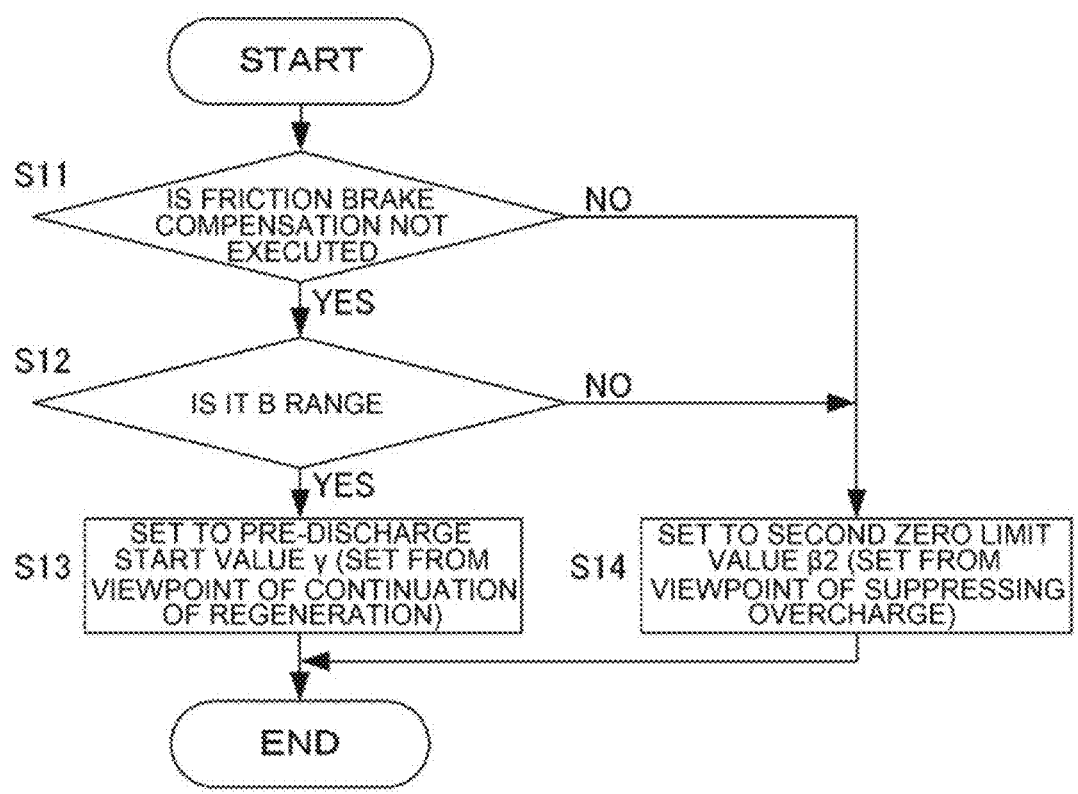
FIG. 10 is a diagram illustrating a flowchart of an example of a setting process of an electric power discharge start SOC.

FIG. 10 is a diagram illustrating a flowchart of an example of a setting process of the electric power discharge start SOC. In step S11, it is determined whether the friction brake compensation is not executed, and in step S12, it is determined whether the shift position is the B range. In a case where determination in step S11 or step S12 is negative, the process proceeds to step S14, and the second zero limit value $\beta 2$ is set as the electric power discharge start SOC. In step S14, the second zero limit value $\beta 2$ is merely set as the electric power discharge start SOC, and functions as the electric power discharge start SOC even in a case where the friction brake compensation is executed. The second zero limit value $\beta 2$ is set from the viewpoint of suppressing the overcharge of the battery 6. In a case where the determination in step S11 and step S12 is positive, the process proceeds to step S13, and the pre-discharge start value $\gamma$ is set as the electric power discharge start SOC. The pre-discharge start value $\gamma$ will be described below with reference to FIG. 6.

As illustrated in FIG. 6, the pre-discharge start value $\gamma$ is set to an SOC lower than the second zero limit value $\beta 2$, and the chargeable electric power is not zero at the pre-discharge start value $\gamma$. The pre-discharge start value $\gamma$ starts electric power discharge at the SOC lower than the second zero limit value $\beta 2$, thereby constituting an electric power discharge start SOC of pre-motoring in which a margin of the SOC is increased in advance as compared with a case where the motoring is started at the second zero limit value $\beta 2$.

The pre-discharge start value $\gamma$ is set to an SOC lower than the first zero limit value $\beta 1$. Therefore, according to the pre-motoring, it is possible to continue for a longer time a state in which the regeneration that cannot be executed when the chargeable electric power is zero can be executed. From the point that the pre-discharge start value $\gamma$ is set from the viewpoint of the continuation of regeneration (in other words, prevention of reduction of regenerative torque in absolute value) as described above, the pre-discharge start value $\gamma$ is different from the second zero limit value $\beta 2$ as the electric power discharge start SOC set to the SOC at which the chargeable electric power is zero from the viewpoint of suppressing the overcharge. The pre-discharge start value $\gamma$ is, for example, an SOC equal to or greater than the second input limitation start value $\alpha 2$.

In a case where the pre-discharge start value $\gamma$ is set, the pre-discharge start value $\gamma$ functions as the electric power discharge start SOC. Therefore, in this case, the second zero limit value $\beta 2$ does not function as the electric power discharge start SOC. Even in the case where the pre-discharge start value $\gamma$ is set, the limitation of input is executed with reference to the second charging characteristic C2. That is, the pre-discharge start value $\gamma$ is merely set for the electric power discharge, and the pre-discharge start value $\gamma$ is also illustrated in FIG. 6 merely for convenience of description. Accordingly, the pre-discharge start value $\gamma$ is not particularly reflected in calculation for regeneration control. The same applies to the second zero limit value $\beta 2$ as the electric power discharge start SOC.

Returning to FIG. 9, the set electric power discharge start SOC is input to the electric power discharge request generation unit 462. The SOC is also input to the electric power discharge request generation unit 462, and an electric power discharge request is generated when the SOC is equal to or greater than the input electric power discharge start SOC. The electric power discharge request is generated as an electric power discharge request corresponding to the second zero limit value $\beta 2$ in a case where the input electric power discharge start SOC is the second zero limit value $\beta 2$, and is generated as an electric power discharge request corresponding to the pre-discharge start value $\gamma$ in a case where the input electric power discharge start SOC is the pre-discharge start value γ. The electric power discharge request is input as the other electric power generation and discharge request to the electric power generation and discharge permission determination unit 451. In this case, the electric power discharge permission flag is set in the electric power generation and discharge permission determination unit 451 as described below.

Figure 11:
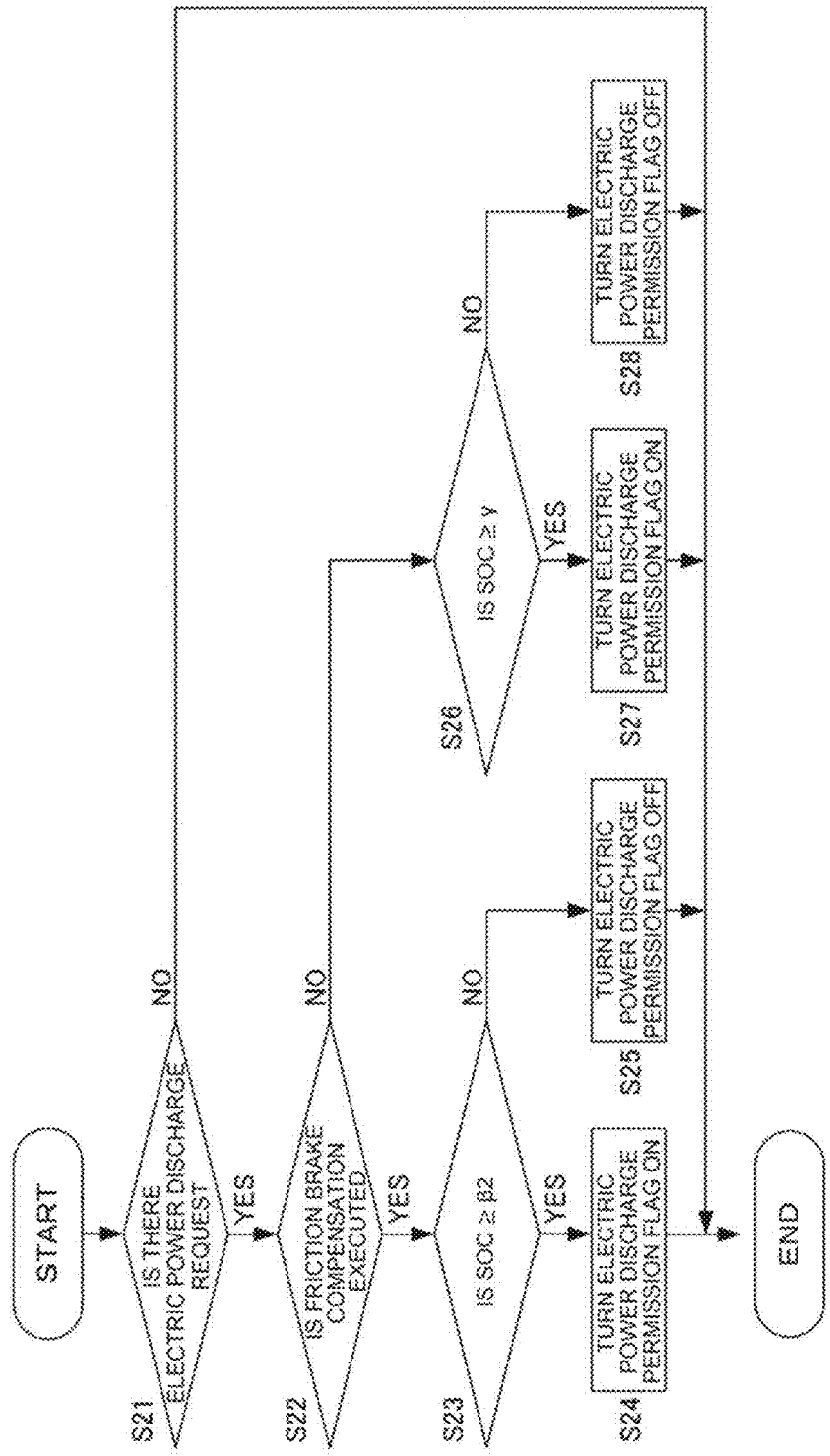
FIG. 11 is a diagram illustrating a flowchart of an example of a setting process of an electric power discharge permission flag.

FIG. 11 is a diagram illustrating a flowchart of an example of a setting process of an electric power discharge permission flag executed by the vehicle controller 40. In step S21, it is determined whether there is an electric power discharge request corresponding to the SOC. When determination in step S21 is negative, the process ends, and when the determination in step S21 is positive, the process proceeds to step S22. In step S22, it is determined whether the friction brake compensation is executed. When determination in step S22 is positive, the process proceeds to step S23, and it is determined whether the SOC is equal to or greater than the second zero limit value β2. That is, in the case where the friction brake compensation is executed, the motoring is executed from the viewpoint of suppressing the overcharge of the battery 6, and thus the second zero limit value β2 is set as a comparison target of the SOC.

When determination in step S23 is positive, the electric power discharge permission flag is turned ON in step S24, and the motoring is permitted. When the determination in step S23 is negative, the electric power discharge permission flag is turned OFF in step S25. The motoring is continued until the SOC is equal to or lower than the electric power discharge completion SOC even when the electric power discharge permission flag is turned OFF. After step S24 or step S25, the process ends.

In a case where the determination in step S22 is negative, the process proceeds to step S26, and it is determined whether the SOC is equal to or greater than the pre-discharge start value γ. That is, in a case where the friction brake compensation is not executed, the motoring is executed from the viewpoint of the continuation of regeneration, and thus the pre-discharge start value γ is set as a comparison target of the SOC. When determination in step S26 is positive, the electric power discharge permission flag is turned ON, and when the determination in step S26 is negative, the electric power discharge permission flag is turned OFF. After step S27 or step S28, the process ends.

Returning to FIG. 5, the electric power generation and discharge permission flag is input from the electric power generation and discharge permission determination unit 451 to the target operation point calculation unit 452. The target operation point calculation unit 452 calculates a target operation point of the engine 1. The target operation point is calculated based on the warm-up request or the other electric power generation and discharge requests in a case where the electric power generation and discharge permission flag is ON. A target torque and a target rotation speed are calculated as the target operation point. The calculated target torque and target rotation speed are input to an electric power generation and discharge system SYS. The electric power generation and discharge permission flag is also input to the electric power generation and discharge system SYS from the electric power generation and discharge permission determination unit 451.

The electric power generation and discharge system SYS executes power generation operation or the motoring of the engine 1 in a case where the electric power generation and discharge permission flag is ON. The electric power generation operation is executed in a case where the electric power generation permission flag is ON, and the motoring is executed in a case where the electric power discharge permission flag is ON. The electric power generation and discharge system SYS includes the motor controller 10 and the engine controller 20, and the target rotation speed is input to the motor controller 10, and the target torque is input to the engine controller 20. The electric power generation and discharge permission flag is input to each of the motor controller 10 and the engine controller 20.

In the electric power generation operation, the engine 1 generates a target torque corresponding to the target generated electric power, and the electric generator 2 generates a torque for receiving the torque generated by the engine 1 so as to achieve a target rotation speed corresponding to the target generated electric power. In the motoring, the electric generator 2 is driven at the target rotation speed, and electric power is consumed by the electric generator 2 to execute electric power discharge. In a case where the electric power generation and discharge permission flag is OFF, the electric power generation operation and the motoring are prohibited.

The electric power generation and discharge control calculation unit 45 constitutes a generated and discharged electric power control unit that executes generated and discharged electric power control for controlling the generated electric power of the electric generator 2 and the discharged electric power by the motoring of the engine 1. The electric power generation and discharge control calculation unit 45 can be considered as two calculation units including an electric power generation control calculation unit and an electric power discharge control calculation unit, and it can be understood that the electric power generation and discharge control calculation unit 45 is implemented by a generated electric power control unit and a discharged electric power control unit. The friction brake compensation determination unit 41, the regenerative electric power limitation calculation unit 42, the target drive regenerative torque calculation unit 43, and the deceleration torque distribution unit 44 constitute a regenerative electric power control unit RG that executes regenerative electric power control for controlling the regenerative electric power of the drive motor 3.

Figure 12:
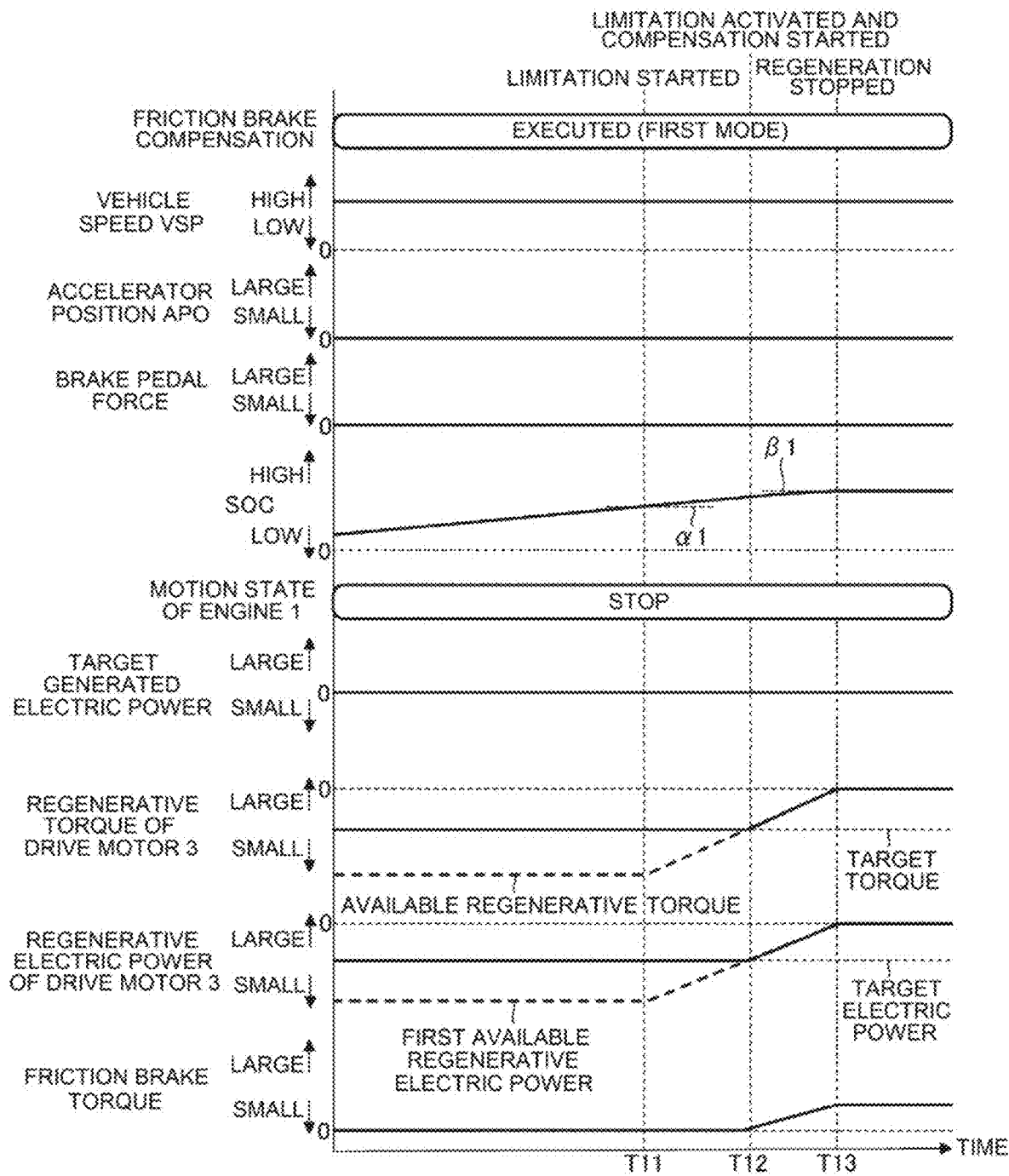
FIG. 12 is a diagram illustrating a first example of a timing chart.

FIG. 12 is a diagram illustrating a first example of a timing chart corresponding to control of the present embodiment. FIG. 12 illustrates changes in the first mode in the case where the friction brake compensation is executed. FIG. 12 illustrates changes in various parameters during the accelerator OFF regeneration. The same applies to FIGS. 13 to 15 to be described later.

At a timing T11, the SOC exceeds the first input limitation start value α1, and the limitation of input to the battery 6 is started. As a result, the first available regenerative electric power and the available regenerative torque start to be reduced in absolute values. The first available regenerative electric power indicates the available regenerative electric power in the case where the friction brake compensation is executed. The regenerative torque is controlled to a target torque smaller than the available regenerative torque in absolute value, and is not limited to the available regenerative torque. The same applies to the first available regenerative electric power. Since the first input limitation start value α1 is lower than the second input limitation start value α2, the limitation of input is started earlier than in the case where the friction brake compensation is not executed.

At a timing T12, the first available regenerative electric power reaches the target electric power and the available regenerative torque reaches the target torque, and the limitation of input and the limitation of regeneration are activated. As a result, the regenerative electric power is limited to the first available regenerative electric power, and the regenerative torque is limited to the available regenerative torque. When the limitation of regeneration is activated, the deceleration is insufficient with respect to the target torque by an amount corresponding to the reduction of the regenerative torque in absolute value. Therefore, at the timing T12, the friction brake compensation is also started, and the friction brake torque starts to increase.

At a timing T13, the first available regenerative electric power and the available regenerative torque are zero, and the SOC is equal to or greater than the first zero limit value β1. As a result, from the timing T13, the electric power input to the battery 6 is limited to zero, and thus the regeneration is stopped. Therefore, the first available regenerative electric power and the available regenerative torque remain zero, and the SOC remains the first zero limit value β1.

Since the first zero limit value β1 is lower than the second zero limit value β2, the battery 6 has a margin in electric power acceptance at the timing T13 as compared to the case where the friction brake compensation is not executed. Therefore, in the example, the motoring is not started at the timing T13, thereby preventing the motoring noise from giving the occupant a feeling of discomfort.

A change speed (change speed during activation of limitation of regeneration between timing T12 and timing T13) of the first available regenerative electric power corresponding to the SOC in the case where the friction brake compensation is executed is set to be slower than a response speed of the friction brake torque. As a result, in the example, a braking force corresponding to an amount corresponding to reduction of the regenerative torque in absolute value with respect to the target torque is compensated by the friction brake torque.

Accordingly, it is possible to prevent a situation in which the deceleration is insufficient with respect to the target torque as a result of the friction brake compensation being delayed with respect to a progress speed of the limitation of regeneration. The friction brake torque may have a target magnitude to be compensated at the timing T13. Such setting of the change speed can be executed by setting a limitation degree of the limitation of input in the first mode that is set such that the limitation degree increases as the SOC increases.

Figure 13:
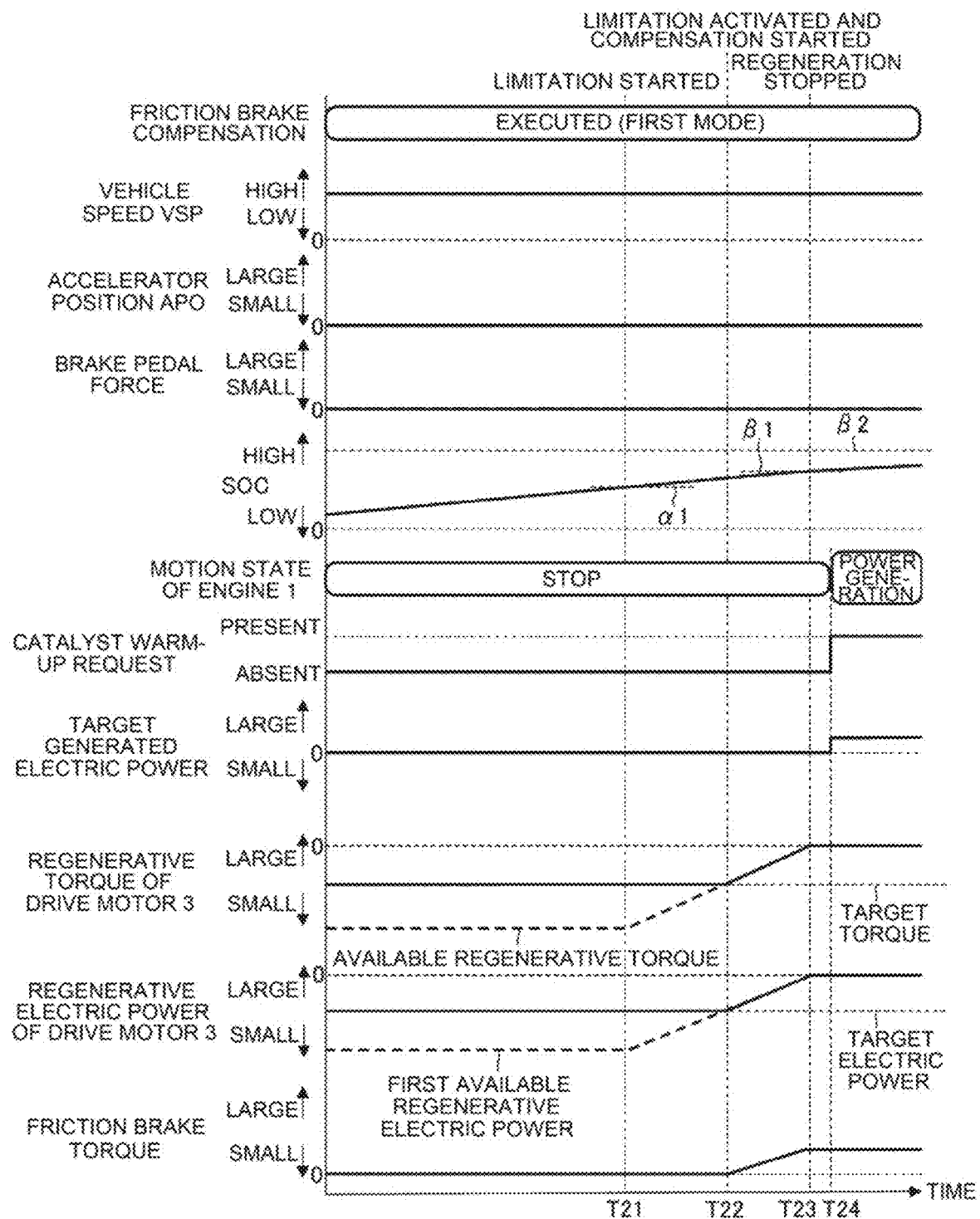
FIG. 13 is a diagram illustrating a second example of the timing chart.

FIG. 13 is a diagram illustrating a second example of the timing chart corresponding to the control of the present embodiment. Similar to the first example illustrated in FIG. 12, FIG. 13 illustrates the case where the friction brake compensation is executed. A change before a timing T23 is the same as the change before the timing T13 in the first example illustrated in FIG. 12. Therefore, a change after the timing T23 will be described below.

In the example, after the regeneration is stopped by limiting the electric power input to the battery 6 to zero at the timing T23, a catalyst warm-up request is made as the warm-up request at a timing T24 during the limitation of input to zero. However, the limitation of input is applied to the regenerative electric power control, and is not applied to the generated electric power control. That is, the limitation of input does not affect the catalyst warm-up request which is an electric power generation request. Therefore, at the timing T24, positive target generated electric power is calculated according to the catalyst warm-up request, and an electric power generation operation corresponding to the target generated electric power is executed in the engine 1.

Accordingly, a catalyst can be warmed up by giving priority to the electric power generation even during the limitation of input of the electric power to the battery 6, and deterioration of exhaust emission is suppressed. In addition, at the timing T24, since the SOC is still lower than the second zero limit value β2 and there is a margin in the electric power acceptance of the battery 6, there is no particular problem in executing the electric power generation operation.

Figure 14:
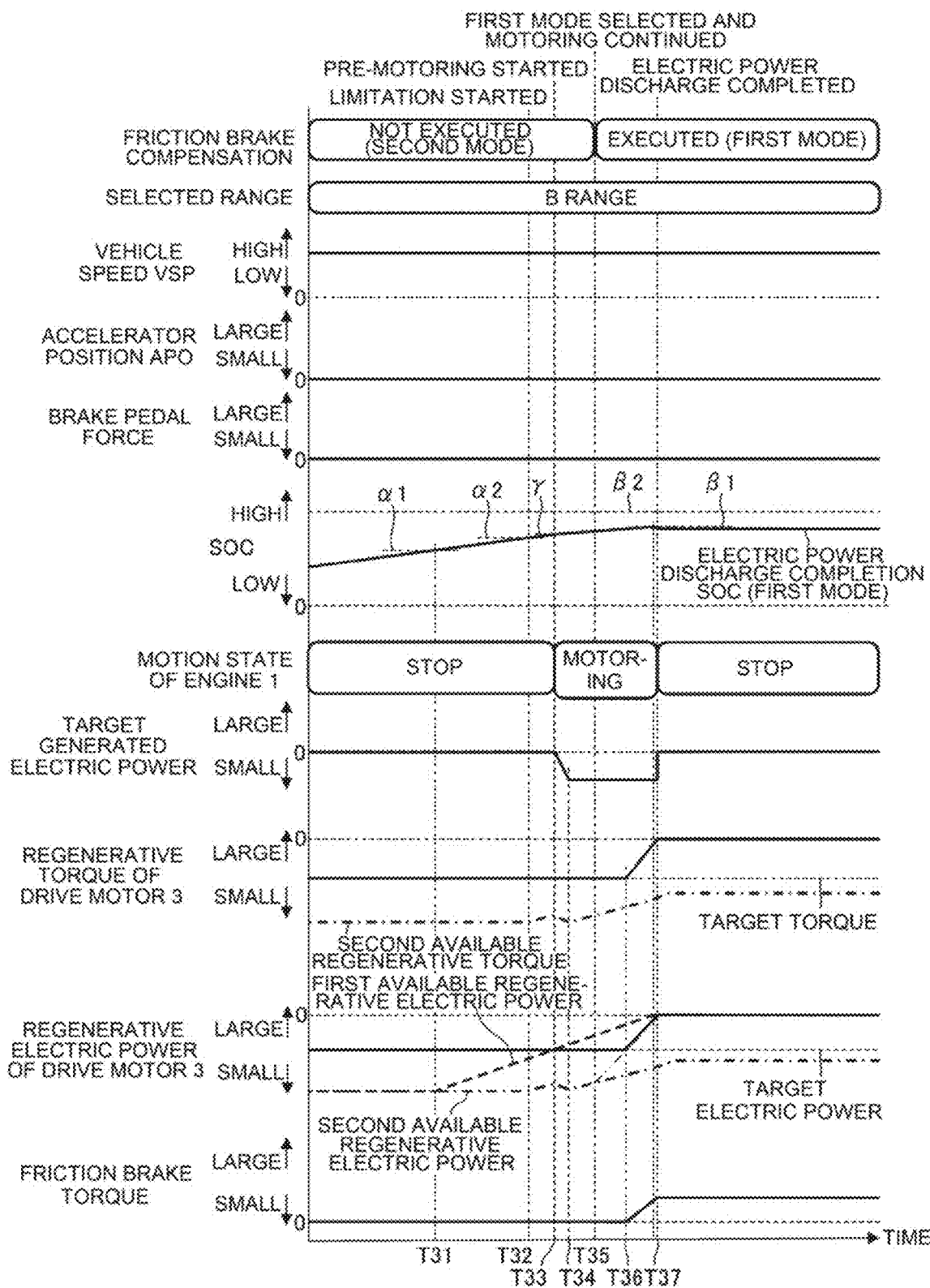
FIG. 14 is a diagram illustrating a third example of the timing chart.

FIG. 14 is a diagram illustrating a third example of the timing chart corresponding to the control of the present embodiment. In the example, a case where the first mode is selected from the second mode in a state where the B range is selected will be described. The second available regenerative electric power indicates the available regenerative electric power in the case where the friction brake compensation is not executed. The available regenerative torque indicates the available regenerative torque corresponding to the second available regenerative electric power.

At a timing T31, the SOC is equal to or greater than the first input limitation start value α1. As a result, the first available regenerative electric power starts to be reduced in absolute value. However, since the friction brake compensation is not executed at the timing T31, the limitation of input and the limitation of regeneration based on the first available regenerative electric power are not executed. Therefore, the second available regenerative torque does not particularly change.

At a timing T32, the SOC is equal to or greater than the second input limitation start value α2. As a result, the limitation of input is started, and the second available regenerative electric power starts to be reduced in absolute value. In response to this, the second available regenerative torque also starts to be reduced in absolute value.

At a timing T33, the SOC is equal to or greater than the pre-discharge start value γ. At the timing T33, since the B range is selected when the friction brake compensation is not executed, the electric power discharge start SOC is set to the pre-discharge start value γ. Therefore, negative target generated electric power is calculated as the target generated electric power, and the pre-motoring is started. Accordingly, it is possible to further continue the regeneration by delaying stop of the regeneration by an amount corresponding to an increase of the available regenerative electric power in absolute value. When the target generated electric power is constant at a timing T34, the available regenerative electric power and the available regenerative torque start to be reduced again in absolute values as the SOC increases.

At a timing T35, the first mode is selected. Therefore, the first available regenerative electric power is to be applied as the available regenerative electric power. However, the first available regenerative electric power has already been reduced in absolute value from the target electric power at the timing T35. Therefore, when the available regenerative electric power is immediately switched from the second available regenerative electric power to the first available regenerative electric power, the regenerative torque suddenly changes and the deceleration is suddenly reduced in absolute value.

Therefore, from the timing T35, the switching rate described above is applied to the second available regenerative electric power when the first mode is selected, and the available regenerative electric power (available regenerative electric power indicated by two-dot chain lines) that changes according to the switching rate is used for the limitation of input instead of the first available regenerative electric power. Since the first mode is selected from the timing T35, the electric power discharge start SOC and the electric power discharge completion SOC in the first mode are applied to the electric power discharge start SOC and the electric power discharge completion SOC. A first electric power discharge completion SOC is as illustrated in the drawing, and the electric power discharge start SOC in the first mode is set to the second zero limit value $\beta 2$.

The electric power discharge completion SOC in the first mode is set to, for example, an SOC slightly lower than the first zero limit value $\beta 1$, and the motoring is stopped when the SOC is equal to or lower than the electric power discharge completion SOC. Even when the second zero limit value $\beta 2$ constitutes the electric power discharge start SOC in the first mode from the timing T35, the motoring continues as it is. In a case where the SOC is higher than the electric power discharge completion SOC set in the first mode, the motoring is continued as it is until the SOC is equal to or lower than the electric power discharge completion SOC in the first mode. The electric power discharge completion SOC is set lower than the electric power discharge start SOC by a predetermined magnitude in order to prevent control hunting.

The regenerative electric power is gradually reduced in absolute value while being limited to the available regenerative electric power that changes according to the switching rate from a timing T36, and the regenerative torque is also gradually reduced in absolute value accordingly. From the timing T36, the friction brake torque also starts to increase as the regenerative electric power is reduced in absolute value. Accordingly, the braking force corresponding to the regenerative torque is compensated by an amount corresponding to the reduction in absolute value with respect to the target torque.

At a timing T37, the available regenerative electric power that changes according to the switching rate is the first available regenerative electric power. As a result, the regenerative electric power is limited by the first available regenerative electric power from the timing T37. The regenerative torque and the friction brake torque also have magnitudes corresponding to the regenerative electric power limited to the first available regenerative electric power.

In the example, the SOC is the first zero limit value $\beta 1$ slightly before the timing T37, and the first available regenerative electric power and the regenerative electric power are zero. On the other hand, the motoring is executed. Therefore, the SOC starts to be reduced, and becomes equal to or lower than the electric power discharge completion SOC in the first mode at the timing T37. As a result, a completion condition of the motoring is satisfied.

In a case where the motoring is stopped, the power consumption by the motoring is no longer executed, and the second available regenerative electric power and the available regenerative torque corresponding thereto are reduced in absolute values. Since the SOC does not change when the motoring is stopped, the second available regenerative electric power and the available regenerative torque corresponding thereto are constant.

Both start determination and completion determination of the motoring may be executed based on, one or more determination elements such as the voltage of the battery 6, the available input electric power to the battery 6 which is a physical property value of the battery 6 affecting the voltage, and regeneration request electric power and discharge request electric power included in an input and output request to the battery 6 as determination elements, not limited to the SOC.

Figure 15:
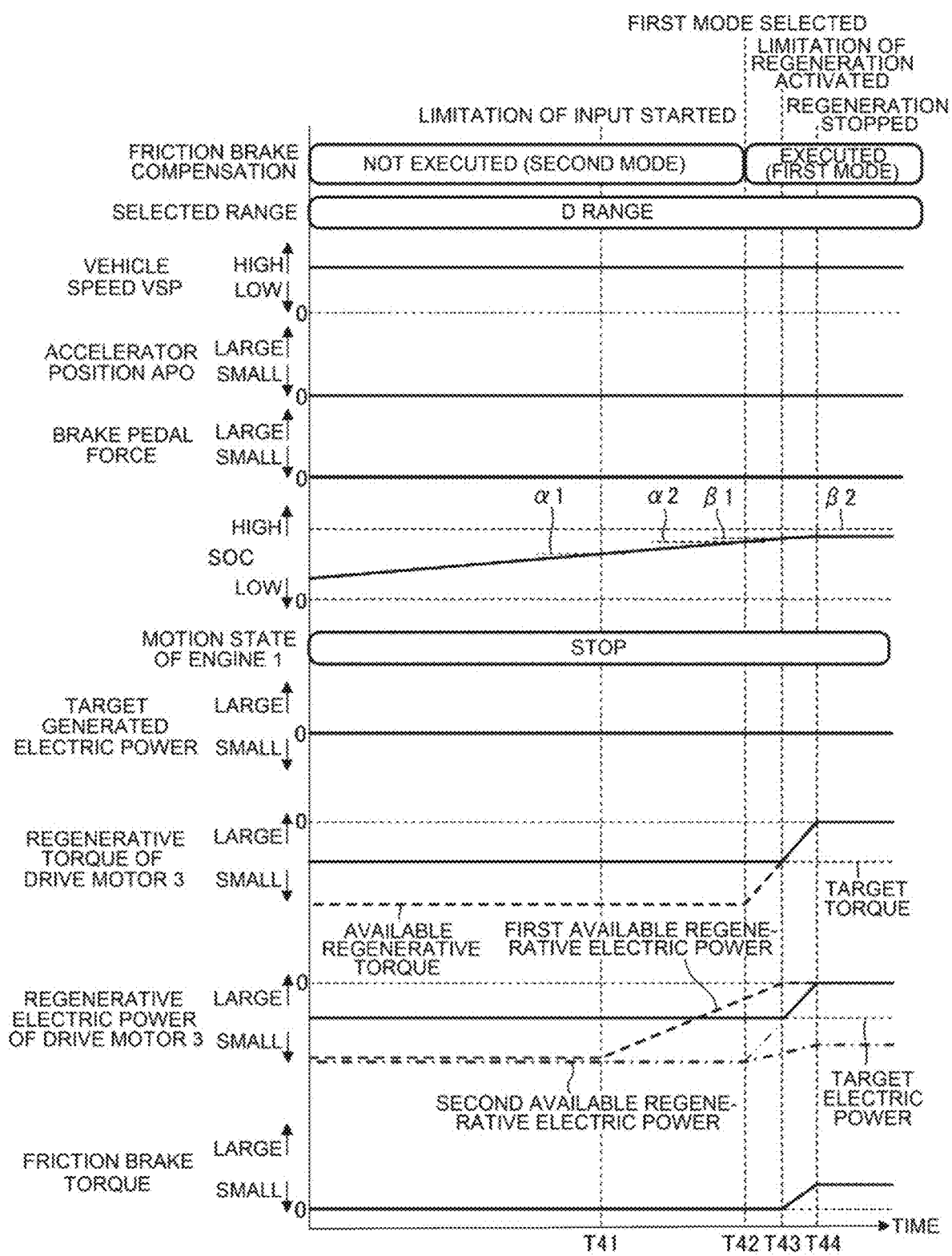
FIG. 15 is a diagram illustrating a fourth example of the timing chart.

FIG. 15 is a diagram illustrating a fourth example of the timing chart corresponding to the control of the present embodiment. In the example, a case where the first mode is selected from the second mode in a state where the D range is selected will be described. At a timing T41, the SOC is equal to or greater than the first input limitation start value $\alpha 1$. As a result, the first available regenerative electric power starts to be reduced in absolute value. However, at the timing T41, since the friction brake compensation is not executed, the available regenerative torque does not change accordingly.

At a timing T42, the first mode is selected, and the friction brake compensation is changed from not being executed to being executed. Accordingly, the first available regenerative electric power is to be applied as the available regenerative electric power. However, the first available regenerative electric power has already been significantly reduced in absolute value as compared with the case where the friction brake compensation is not executed. Therefore, from the timing T42, the second available regenerative electric power when the first mode is selected is changed according to the switching rate, and the available regenerative electric power is used for the limitation of input instead of the first available regenerative electric power. As a result, at the timing T42, the regenerative electric power remains controlled to the target electric power, and the limitation of input is not executed. Accordingly, the deceleration is prevented from being rapidly reduced in absolute value.

At a timing T43, the available regenerative electric power that changes according to the switching rate reaches the target electric power. Therefore, the limitation of regeneration of the drive motor 3 is activated from the timing T43, and the regenerative torque controlled to the target torque is limited to the available regenerative torque. At the timing T43, the friction brake compensation is also started to compensate for the braking force corresponding to the regenerative torque by an amount corresponding to the reduction in absolute value due to the limitation of regeneration. As a result, the friction brake torque starts to increase. In the example, the SOC reaches the first zero limit value $\beta 1$ at the timing T43, but the SOC continues to increase since the available regenerative electric power that changes according to the switching rate is used for the limitation of input.

At a timing T44, the available regenerative torque is zero. Accordingly, the regenerative torque is zero, and the regeneration is stopped. At the timing T44, the friction brake torque generates a deceleration torque of an amount corresponding to a reduction of the regenerative torque due to the limitation of the regenerative electric power, and corresponds to the target regenerative torque. The change speed of the available regenerative electric power according to the switching rate is slower than the response speed of the friction brake torque due to the characteristics of the switching rate described above with reference to FIG. 8. Accordingly, it is possible to prevent the situation in which the deceleration is insufficient with respect to the target torque as a result of the friction brake compensation following the progress speed of the limitation of regeneration.

Next, main functions and effects of the present embodiment will be described.

The control method for the vehicle 100 according to the present embodiment is used for the vehicle 100 including the engine 1, the electric generator 2, the drive motor 3, and the battery 6, the electric generator 2 being driven by the engine 1 to generate electric power, the drive motor 3 being driven by the electric power generated by the electric generator 2, and the regenerative electric power of the drive motor 3 being supplied to the battery 6. The vehicle 100 has the first mode in which the friction brake compensation which is the braking force compensation by the friction brake 71 is executed during the accelerator OFF regeneration, and the second mode in which the friction brake compensation is not executed during the accelerator OFF regeneration. The control method for the vehicle 100 includes executing the limitation of input to the battery 6, and allowing the SOC at which the electric power input to the battery 6 is zero due to the limitation of input to be different between the first mode and the second mode.

Here, in the case where the friction brake compensation is not executed, when the electric power input to the battery 6 is limited to zero, the regeneration cannot be executed, and the deceleration is insufficient with respect to the target torque. Therefore, in this case, in order to compensate for the insufficiency of the deceleration due to the limitation of input to the battery 6, electric power discharge by motoring is required. That is, in order to compensate for the insufficiency of the deceleration by increasing the chargeable electric power of the battery 6 by the motoring and executing regeneration correspondingly, the electric power discharge by motoring is required.

On the other hand, in the case where the friction brake compensation is executed, even when the regeneration cannot be executed, the regenerative torque of an amount corresponding to the insufficiency can be compensated by the friction brake compensation. Therefore, in this case, the SOC that limits the electric power input to the battery 6 to zero does not need to be set as high as possible within a range in which the overcharge does not occur, and since the battery 6 still has some margin for the electric power acceptance at such an SOC, it is not necessarily required to execute the electric power discharge by motoring.

According to the method of the present embodiment, focusing on the above circumstances, the SOC that limits the input electric power to zero is allowed to be different between the first mode and the second mode. Therefore, even when the input electric power is limited to zero, the motoring can be omitted in the first mode. As a result, it is possible to reduce the feeling of discomfort that may be given to the occupant due to the motoring noise. In addition, according to such a method, the occupant is not given a feeling of discomfort caused by the insufficiency of the deceleration in relation to the target torque.

The method according to the present embodiment further includes, in the case where the first mode is selected, starting the limitation of input and stopping the regeneration of the drive motor 3 at an SOC lower than that in the case where the second mode is selected. According to such a method, in the first mode, the limitation of input is started earlier than in the second mode, and the regeneration is stopped, thereby providing a margin for the electric power acceptance of the battery 6 when the input electric power is set to zero. As a result, even when the input electric power is limited to zero, the motoring can be omitted in the first mode. Accordingly, it is possible to reduce the feeling of discomfort that may be given to the occupant due to the motoring noise.

The method according to the present embodiment further includes executing the motoring of the engine 1 by the electric generator 2, and in the case where the first mode is selected, the electric power input to the battery 6 is limited to zero by the limitation of input before the motoring is started. According to such a method, in the first mode, the motoring is started after the electric power input to the battery 6 is limited to zero, so that there is no need to execute the motoring even when the input electric power is limited to zero, thereby reducing the feeling of discomfort that may be given to the occupant due to the motoring noise.

The method according to the present embodiment further includes executing the regenerative electric power control for controlling the regenerative electric power of the drive motor 3, and executing the generated electric power control for controlling the generated electric power of the electric generator 2. The limitation of input is applied to the regenerative electric power control, and is not applied to the generated electric power control. According to such a method, the electric power generation can be executed regardless of the limitation of input, and the electric power generation request can be satisfied by executing the electric power generation in preference to reduction of the motoring noise. Accordingly, for example, in a case where there is a warm-up request, the engine 1 can be operated in response to the warm-up request regardless of the limitation of input, and a situation in which the warm-up cannot be executed due to the limitation of input can be avoided.

The method according to the present embodiment further includes executing the motoring of the engine 1 by the electric generator 2 and executing the pre-motoring to be executed by motorizing the engine 1 by the electric generator 2 at an SOC lower than that in the motoring. In the case where the first mode is selected, the execution of the pre-motoring is prohibited. According to such a method, in the first mode, in view of a matter that the friction brake compensation is possible at the time of stop of the regeneration, the execution of the pre-motoring executed based on the viewpoint of the continuation of regeneration is prohibited. Therefore, it is possible to reduce the feeling of discomfort that may be given to the occupant due to the motoring noise caused by the pre-motoring.

The method according to the present embodiment further includes executing the motoring of the engine 1 by the electric generator 2. The regeneration of the drive motor 3 is stopped by limiting the electric power input to the battery 6 to zero. In a case where the first mode is selected while the motoring is being executed, the motoring is continued while a motoring completion condition of the first mode is not satisfied, that is, while the SOC does not become the electric power discharge completion SOC in the first mode even in a case where a motoring start condition of the first mode is not satisfied, that is, even in a case where the SOC does not become the electric power discharge start SOC in the first mode. According to such a method, in the first mode, the motoring should be executed according to the motoring start condition and the motoring completion condition of the first mode, but in a case where the motoring has already been executed, the electric power discharge by motoring is prioritized, so that it is possible to achieve early reduction of the SOC.

In the method according to the present embodiment, as a change speed of the limitation of input in response to a change in the SOC, a change speed of the limitation of input executed in the first mode is set to be equal to or lower than a response speed of a brake torque compensated by the friction brake 71. In the method according to the present embodiment, the change speed of the limitation of input obtained by changing the available input electric power according to the switching rate, that is, a change speed of the available regenerative electric power corresponding to the switching rate is set equal to or lower than the response speed of the brake torque compensated by the friction brake. According to the method, it is possible to appropriately compensate for the regenerative torque of an amount lost due to the limitation of regeneration with the brake torque, so that it is possible to appropriately suppress a change in the deceleration.

In the method according to the present embodiment, in the case of the transition from the second mode to the first mode, as the limitation of input to the battery 6, limitation of input obtained by applying the switching rate to the chargeable electric power in the second mode when the first mode is selected and changing the chargeable electric power according to the switching rate is used. According to such a method, it is possible to prevent a situation in which the deceleration suddenly changes due to immediate application of the limitation of input executed in the first mode at the time of the transition from the second mode to the first mode.

Although the embodiment of the present invention has been described above, the above embodiment is merely a part of application examples of the present invention, and does not mean that the technical scope of the present invention is limited to the specific configurations of the above embodiment.

The invention claimed is:

1. A control method for a vehicle, the vehicle including an engine, an electric generator, a drive motor, and a battery, the electric generator being driven by the engine to generate electric power, the drive motor being driven by the electric power generated by the electric generator, and regenerative electric power of the drive motor being supplied to the battery, the vehicle having a first mode in which braking force compensation by a friction brake is executed during accelerator OFF regeneration which is regeneration by the drive motor in a state where no accelerator operation is executed, and a second mode in which the braking force compensation by the friction brake is not executed during the accelerator OFF regeneration, the method comprising:

executing limitation of electric power input to the battery; and allowing a voltage of the battery, in which the electric power input to the battery is zero due to the limitation of the electric power input, or a physical property value of the battery, affecting the voltage, to be different between the first mode and the second mode.

2. The control method for a vehicle according to claim 1, wherein
the physical property value includes an SOC of the battery, and
the method further comprises, in a case where the first mode is selected, starting the limitation of input and stopping the regeneration of the drive motor at an SOC lower than that in a case where the second mode is selected.

3. The control method for a vehicle according to claim 1, further comprising:
executing motoring of the engine by the electric generator, wherein
in a case where the first mode is selected, the electric power input to the battery is limited to zero by the limitation of input before the motoring is started.

4. The control method for a vehicle according to claim 1, further comprising:
executing motoring of the engine by the electric generator,
executing regenerative electric power control for controlling the regenerative electric power of the drive motor, and
executing generated electric power control for controlling generated electric power of the electric generator, wherein the limitation of input is applied to the regenerative electric power control, and is not applied to the generated electric power control.

5. The control method for a vehicle according to claim 1, wherein
the physical property value includes an SOC of the battery,
the method further comprises executing motoring of the engine by the electric generator, and
executing pre-motoring by motorizing the engine by the electric generator at an SOC lower than that in the motoring, and
in a case where the first mode is selected, execution of the pre-motoring is prohibited.

6. The control method for a vehicle according to claim 1, further comprising:
executing motoring of the engine by the electric generator, wherein
regeneration of the drive motor is stopped by limiting the electric power input to the battery to zero, and
in a case where the first mode is selected while the motoring is being executed, the motoring is continued while a motoring completion condition of the first mode is not satisfied even in a case where a motoring start condition of the first mode is not satisfied.

7. The control method for a vehicle according to claim 1, wherein
the physical property value includes an SOC of the battery, and
as a change speed of the limitation of input in response to a change in the SOC, a change speed of the limitation of input executed in the first mode is set to be equal to or lower than a response speed of a brake torque compensated by the friction brake.

8. The control method for a vehicle according to claim 1, wherein
in a case of transition from the second mode to the first mode, as the limitation of input, limitation of input obtained by applying a change rate to available input electric power of the drive motor in the second mode when the first mode is selected and changing the available input electric power according to the change rate is used.

9. The control method for a vehicle according to claim 8, wherein a change speed of the limitation of input obtained by changing the available input electric power according to the change rate is set equal to or lower than a response speed of a brake torque compensated by the friction brake.

10. A vehicle including an engine, an electric generator, a drive motor, and a battery, the electric generator being driven by the engine to generate electric power, the drive motor being driven by the electric power generated by the electric generator, and regenerative electric power of the drive motor being supplied to the battery, and the vehicle having a first mode in which braking force compensation by a friction brake is executed during accelerator OFF regeneration which is regeneration by the drive motor in a state where no accelerator operation is executed, and a second mode in which the braking force compensation by the friction brake is not executed during the accelerator OFF regeneration, the vehicle comprising:

a controller configured to allow a voltage of the battery, in which electric power input to the battery is zero due to a limitation of the electric power input to the battery, or a physical property value of the battery, affecting the voltage, to be different between the first mode and the second mode, and execute the limitation of the electric power input.

* * * * *